United States Patent
Zhang et al.

(10) Patent No.: US 10,778,281 B2
(45) Date of Patent: Sep. 15, 2020

(54) METHOD AND DEVICE FOR CONTROLLING FREQUENCY HOPPING, TRANSMITTER AND RECEIVER

(71) Applicant: HARXON CORPORATION, Guangdong (CN)

(72) Inventors: Haijun Zhang, Guangdong (CN); Juanjuan Xu, Guangdong (CN); Shiwei Wu, Guangdong (CN); Jie Zhang, Guangdong (CN)

(73) Assignee: HARXON CORPORATION, Guangdong (CN)

( * ) Notice: Subject to any disclaimer, the term of this patent is extended or adjusted under 35 U.S.C. 154(b) by 0 days.

(21) Appl. No.: 16/641,252

(22) PCT Filed: Oct. 11, 2017

(86) PCT No.: PCT/CN2017/105617
§ 371 (c)(1),
(2) Date: Feb. 24, 2020

(87) PCT Pub. No.: WO2019/037208
PCT Pub. Date: Feb. 28, 2019

(65) Prior Publication Data
US 2020/0195300 A1    Jun. 18, 2020

(30) Foreign Application Priority Data
Aug. 22, 2017 (CN) .......................... 2017 1 0725093

(51) Int. Cl.
*H04B 1/00* (2006.01)
*H04B 1/7156* (2011.01)
(Continued)

(52) U.S. Cl.
CPC ............. *H04B 1/7156* (2013.01); *H04B 1/02* (2013.01); *H04B 1/06* (2013.01); *H04B 1/7136* (2013.01); *H04B 1/7143* (2013.01)

(58) Field of Classification Search
CPC ...... H04B 1/714; H04B 1/1756; H04B 1/713; H04W 7/04; H04W 12/64
(Continued)

(56) References Cited

U.S. PATENT DOCUMENTS 9,078,285 B2 *  7/2015  Sun ...................... H04B 1/7156
2008/0107157 A1  5/2008  De Ruijter
(Continued)

FOREIGN PATENT DOCUMENTS

CN    101753201    6/2010
CN    103532590    1/2014
CN    106332267    1/2017

OTHER PUBLICATIONS

"International Search Report (Form PCT/ISA/210) of PCT/CN2017/105617", dated May 7, 2018, with English translation thereof, pp. 1-4.

*Primary Examiner* — Khai Tran
(74) *Attorney, Agent, or Firm* — JCIP Global Inc.

(57) ABSTRACT

The present disclosure provides a method for controlling frequency hopping, a transmitter and a receiver, the method comprising: switching a synchronization frequency to any pre-configured synchronization frequency value when a time slot for sending a synchronization frame is reached, and sending the synchronization frame; after the previous synchronization frame is sent, switching the synchronization frequency from the previous pre-configured synchronization frequency value to any pre-configured synchronization frequency value, and sending the synchronization frame; after a total time slot for sending a synchronization frame is complete, switching a data frequency to any pre-configured
(Continued)

data frequency value, and sending the data frame when the time slot for sending a data frame is reached; or, receiving a data frame when a time slot for receiving a data frame is reached; after the previous data frame is sent or received, and sending a data frame, switching the data frequency from a previous pre-configured data frequency value to any pre-configured frequency value; or, receiving the data frame. By applying the technical solution of the present disclosure, the operating state of a frequency hopping system may be accurately controlled, thereby improving the controllability of the frequency hopping system.

7 Claims, 4 Drawing Sheets

(51) Int. Cl.
*H04B 1/7143* (2011.01)
*H04B 1/06* (2006.01)
*H04B 1/02* (2006.01)
*H04B 1/7136* (2011.01)

(58) Field of Classification Search
USPC .......................... 375/133, 136; 370/480, 328
See application file for complete search history.

(56) References Cited

U.S. PATENT DOCUMENTS

| 2009/0279588 | A1* | 11/2009 | Mochizuki | .......... H04L 27/2647 |
| | | | | 375/137 |
| 2011/0122923 | A1* | 5/2011 | Saitou | .................... H04B 1/713 |
| | | | | 375/136 |

* cited by examiner

METHOD AND DEVICE FOR CONTROLLING FREQUENCY HOPPING, TRANSMITTER AND RECEIVER

CROSS-REFERENCE TO RELATED APPLICATION

This application is a 371 of international application of PCT application serial no. PCT/CN2017/105617, filed on Oct. 11, 2017, which claims the priority benefit of China application no. 201710725093.8, filed on Aug. 22, 2017. The entirety of each of the above mentioned patent applications is hereby incorporated by reference herein and made a part of this specification.

TECHNICAL FIELD

The present disclosure relates to the field of wireless communication, in particular to a method and device for controlling frequency hopping, a transmitter and a receiver.

BACKGROUND

With the development of communication technology, it's necessary to adopt anti-interception and anti-interference communication methods to prevent the contents of communication from being intercepted and interfered during transmission, and one of the anti-interception and anti-interference communication methods is frequency hopping technology.

Frequency hopping technology is a method of transmitting signals by changing the carrier frequency discretely according to a pre-configured rule in a frequency hopping system, and in order to enable a receiving end to obtain effective signals sent by a sending end using the frequency hopping technology, a hopping frequency output by the receiving end must be strictly synchronized with a frequency generated by a frequency hopping device of the sending end; however, due to the inferior controllability of the frequency hopping system in the prior art and low transmission efficiency during transmission in the frequency hopping system, abnormality is easy to occur during transmission in the frequency hopping system, and how to improve the controllability of the frequency hopping system is the key to solving the above problems.

SUMMARY

The following technical solutions are provided to overcome or at least partially solve the above-mentioned technical problems: A first embodiment of the present disclosure provides a method for controlling frequency hopping, comprising: switching a frequency used for sending synchronization data to any of a plurality of pre-configured synchronization frequency values when a time slot for sending a synchronization frame is detected to be reached, and sending the synchronization frame at the pre-configured synchronization frequency value switched to; after the previous synchronization frame is sent, switching the frequency used for sending the synchronization data from the previous pre-configured synchronization frequency value to any of the plurality of pre-configured synchronization frequency values, and sending the synchronization frame at the pre-configured synchronization frequency value switched to; after total time slots for sending the synchronization frame is complete, switching a frequency used for sending or receiving data to any of a plurality of pre-configured data frequency values, and sending a data frame at the pre-configured data frequency value switched to when a time slot for sending the data frame is detected to be reached; or receiving the data frame at the pre-configured data frequency value switched to when a time slot for receiving the data frame is detected to be reached; after the previous data frame is sent or received, switching the frequency used for sending or receiving data from the previous pre-configured data frequency value to any of the plurality of pre-configured frequency, and sending the data frame at the pre-configured data frequency value switched to; or, receiving the data frame at the pre-configured data frequency value switched to.

Optionally, the method further comprises: detecting a next time slot for sending the synchronization frame when total time slots for sending or receiving the data frame is complete.

Optionally, the synchronization data comprises a transmitter frequency hopping starting count value corresponding to a pre-set clock added into the synchronization frame; wherein the method further comprises: checking the synchronization frame before the synchronization frame is sent.

Optionally, the step of after the previous data frame is sent or received, switching the frequency used for sending or receiving data from the previous pre-configured data frequency value to any of the plurality of pre-configured frequency, and sending the data frame at the pre-configured data frequency value switched to; or, receiving the data frame at the pre-configured data frequency value switched to comprises: after the previous data frame is sent or received, in a case that the next time slot is detected to be a time slot for sending the data frame and a data frame to be sent exists, switching the frequency used for sending or receiving data from the previous pre-configured data frequency value to any of the plurality of pre-configured frequency values, and sending the data frame when the time slot for sending the data frame is reached; or, after the previous data frame is sent or received, in a case that the next time slot is detected to be a time slot for receiving the data frame, switching the frequency used for sending or receiving data from the previous pre-configured data frequency value to any of the plurality of pre-configured frequency values, and receiving the data frame when the time slot for receiving the data frame is reached.

Optionally, the method further comprises: after the previous data frame is sent or received, in a case that the next time slot is detected to be a time slot for sending the data frame and no data frame to be sent exists, not switching the data frequency and not sending data frame a until the next time slot is detected to be a time slot for sending the data frame and a data frame to be sent exists, or until the next time slot is detected to be a time slot for receiving the data frame.

A second embodiment of the present disclosure provides a device for controlling frequency hopping, comprising: a first sending module, configured to switch a frequency used for sending synchronization data to any of a plurality of pre-configured synchronization frequency values when a time slot for sending a synchronization frame is detected to be reached, and send the synchronization frame at the pre-configured synchronization frequency value switched to; a second sending module, configured to, after the previous synchronization frame is sent, switch the frequency used for sending the synchronization data from the previous pre-configured synchronization frequency value to any of the plurality of pre-configured synchronization frequency values, and send the synchronization frame at the pre-configured synchronization frequency value switched to; a first sending-and-receiving module, configured to, after total time slots for sending the synchronization frame is complete, switch a frequency used for sending or receiving data to any of a plurality of pre-configured data frequency values, and send a data frame at the pre-configured data frequency value switched to when a time slot for sending the data frame is detected to be reached; or receive the data frame at the pre-configured data frequency value switched to when a time slot for receiving the data frame is detected to be reached; a second sending-and-receiving module, configured to, after the previous data frame is sent or received, switch the frequency used for sending or receiving data from the previous pre-configured data frequency value to any of the plurality of pre-configured frequency, and send the data frame at the pre-configured data frequency value switched to; or, receive the data frame at the pre-configured data frequency value switched to.

Optionally, the device further comprises: a detecting module, configured to detect a next time slot for sending the synchronization frame when total time slots for sending or receiving the data frame is complete.

Optionally, the synchronization data comprises a transmitter frequency hopping starting count value corresponding to a pre-set clock added into the synchronization frame;

wherein the device further comprises: a checking module, used for checking the synchronization frame before the synchronization frame is sent.

Optionally, the second sending-and-receiving module comprises: a sending unit, configured to, after the previous data frame is sent or received, in a case that the next time slot is detected to be a time slot for sending the data frame and a data frame to be sent exists, switch the frequency used for sending or receiving data from the previous pre-configured data frequency value to any of the plurality of pre-configured frequency values, and send the data frame when the time slot for sending the data frame is reached; and a receiving unit, configured to, after the previous data frame is sent or received, in a case that the next time slot is detected to be a time slot for receiving the data frame, switch the frequency used for sending or receiving data from the previous pre-configured data frequency value to any of the plurality of pre-configured frequency values, and receive the data frame when the time slot for receiving the data frame is reached.

Optionally, the device further comprises: a stop-sending module, configured to, after the previous data frame is sent or received, in a case that the next time slot is detected to be a time slot for sending the data frame and no data frame to be sent exists, not switch the data frequency and not sending data frame until the next time slot is detected to be a time slot for sending the data frame and a data frame to be sent exists, or until the next time slot is detected to be a time slot for receiving the data frame.

A third embodiment of the present disclosure provides a transmitter, comprising: a device for controlling frequency hopping of any one of the technical solutions described above.

A fourth embodiment of the present disclosure provides a method for controlling frequency hopping, comprising: switching a frequency used for receiving synchronization data to a corresponding pre-configured synchronization frequency value for sending the synchronization data by a transmitter when a time slot for receiving a synchronization frame is detected to be reached, and receiving the synchronization frame at the corresponding pre-configured synchronization frequency value switched to; after the synchronization frame sent by the transmitter is received and frequency hopping synchronization is complete, switching the frequency used for receiving the synchronization data from the previous corresponding pre-configured synchronization frequency value to a next corresponding pre-configured synchronization frequency value used for sending the synchronization data by the transmitter, and receiving the synchronization frame at the next corresponding pre-configured synchronization frequency value switched to; after total time slots for receiving the synchronization frame is complete, switching a frequency used for sending or receiving data to the corresponding pre-configured data frequency value for sending or receiving data by the transmitter when a time slot for sending or receiving data is detected to be reached, and sending a data frame at the corresponding pre-configured data frequency value switched to when a time slot for sending the data frame is detected to be reached; or receiving the data frame at the corresponding pre-configured data frequency value switched to when a time slot for receiving the data frame is detected to be reached; after the previous data frame is sent or received, switching the frequency used for sending or receiving data from the previous corresponding pre-configured data frequency value to a next corresponding pre-configured data frequency value for sending or receiving data by the transmitter, and sending the data frame at the next corresponding pre-configured data frequency value switched to; or receiving the data frame at the next corresponding pre-configured data frequency value switched to.

Optionally, the method further comprises: detecting a next time slot for receiving the synchronization frame when total time slots for sending or receiving the data frame is complete.

Optionally, the synchronization data comprises a transmitter frequency hopping starting count value corresponding to a pre-set clock added into the synchronization frame;

wherein the method further comprises: checking the synchronization frame after the synchronization frame is received.

Optionally, the step of after the previous data frame is sent or received, switching the frequency used for sending or receiving data from the previous corresponding pre-configured data frequency value to a next corresponding pre-configured data frequency value for sending or receiving data by the transmitter, and sending the data frame at the next corresponding pre-configured data frequency value switched to; or receiving the data frame at the next corresponding pre-configured data frequency value switched to comprises: after the previous data frame is sent or received, in a case that the next time slot is detected to be the time slot for sending the data frame and a data frame to be sent exists, switching the frequency for sending or receiving data from the previous corresponding pre-configured data frequency value to the next corresponding pre-configured data frequency value for sending or receiving data by the transmitter, and sending the data frame when the time slot for sending the data frame is reached; or after the previous data frame is sent or received, in a case that the next time slot is detected to be a time slot for receiving the data frame, switching the frequency for sending or receiving data from the previous corresponding pre-configured data frequency value to the next corresponding pre-configured data frequency value for sending or receiving data by the transmitter, and receiving the data frame when the time slot for receiving the data frame is reached.

Optionally, the method further comprises: after the previous data frame is sent or received, in a case that the next time slot is detected to be a time slot for sending the data frame and no data frame to be sent exists, not switching the data frequency and not sending data frame until the next time slot is detected to be a time slot for sending the data frame and a data frame to be sent exists, or until the next time slot is detected to be a time slot for receiving the data frame.

Optionally, the method further comprises: switching the frequency used for receiving the synchronization data from the previous corresponding pre-configured synchronization frequency value to a next corresponding pre-configured synchronization frequency value used for sending the synchronization data by the transmitter when the synchronization frame sent by the transmitter is received and frequency hopping synchronization is not complete, and receiving the synchronization frame at the next corresponding pre-configured synchronization frequency value switched to, until the frequency hopping synchronization is complete.

Optionally, the method further comprises: before total time slots for receiving the synchronization frame is complete, detecting frequency hopping asynchronization after the synchronization frame sent by the transmitter is received and the frequency hopping synchronization is complete; switching the frequency used for receiving the synchronization data from the previous corresponding pre-configured synchronization frequency value to a next corresponding pre-configured synchronization frequency value used for sending the synchronization data by the transmitter when the frequency hopping asynchronization is detected, and receiving the synchronization frame at the next corresponding pre-configured synchronization frequency value switched to, until the frequency hopping synchronization is complete.

A fifth embodiment of the present disclosure provides a device for controlling frequency hopping, comprising: a first receiving module, configured to switch a frequency used for receiving synchronization data to a corresponding pre-configured synchronization frequency value for sending the synchronization data by a transmitter when a time slot for receiving a synchronization frame is detected to be reached, and receive the synchronization frame at the corresponding pre-configured synchronization frequency value switched to; a second receiving module, configured to, after the synchronization frame sent by the transmitter is received and frequency hopping synchronization is complete, switch the frequency used for receiving the synchronization data from the previous corresponding pre-configured synchronization frequency value to a next corresponding pre-configured synchronization frequency value used for sending the synchronization data by the transmitter, and receive the synchronization frame at the next corresponding pre-configured synchronization frequency value switched to; a first data frame sending-and-receiving module, configured to, after total time slots for receiving the synchronization frame is complete, switch a frequency used for sending or receiving data to the corresponding pre-configured data frequency value for sending or receiving data by the transmitter when a time slot for sending or receiving data is detected to be reached, and send a data frame at the corresponding pre-configured data frequency value switched to when a time slot for sending the data frame is detected to be reached; or receive the data frame at the corresponding pre-configured data frequency value switched to when a time slot for receiving the data frame is detected to be reached; a second data frame sending-and-receiving module, configured to, after the previous data frame is sent or received, switch the frequency used for sending or receiving data from the previous corresponding pre-configured data frequency value to a next corresponding pre-configured data frequency value for sending or receiving data by the transmitter, and send the data frame at the next corresponding pre-configured data frequency value switched to; or receive the data frame at the next corresponding pre-configured data frequency value switched to.

Optionally, the device further comprises: a time slot detecting module, configured to detect a next time slot for receiving the synchronization frame when total time slots for sending or receiving the data frame is complete.

Optionally, the synchronization data comprises a transmitter frequency hopping starting count value corresponding to a pre-set clock added into the synchronization frame; wherein the device further comprises a synchronization frame checking module, configured to check the synchronization frame after the synchronization frame is received.

Optionally, the second data frame sending-and-receiving module comprises: a data frame sending unit, configured to, after the previous data frame is sent or received, in a case that the next time slot is detected to be the time slot for sending the data frame and a data frame to be sent exists, switch the frequency for sending or receiving data from the previous corresponding pre-configured data frequency value to the next corresponding pre-configured data frequency value for sending or receiving data by the transmitter, and send the data frame when the time slot for sending the data frame is reached; a data frame receiving unit, configured to, after the previous data frame is sent or received, in a case that the next time slot is detected to be a time slot for receiving the data frame, switch the frequency for sending or receiving data from the previous corresponding pre-configured data frequency value to the next corresponding pre-configured data frequency value for sending or receiving data by the transmitter, and receive the data frame when the time slot for receiving the data frame is reached.

Optionally, the device further comprises: a data frame stop-sending module, configured to, after the previous data frame is sent or received, in a case that the next time slot is detected to be a time slot for sending the data frame and no data frame to be sent exists, not switch the data frequency and not sending data frame until the next time slot is detected to be a time slot for sending the data frame and a data frame to be sent exists, or until the next time slot is detected to be a time slot for receiving the data frame.

Optionally, the device further comprises: a third receiving module, configured to, switch the frequency used for receiving the synchronization data from the previous corresponding pre-configured synchronization frequency value to a next corresponding pre-configured synchronization frequency value used for sending the synchronization data by the transmitter when the synchronization frame sent by the transmitter is received and frequency hopping synchronization is not complete, and receiving the synchronization frame at the next corresponding pre-configured synchronization frequency value switched to, until the frequency hopping synchronization is complete.

Optionally, the device further comprises: a frequency hopping asynchronization detection module, configured to, before total time slots for receiving the synchronization frame is complete, detect frequency hopping asynchronization after the synchronization frame sent by the transmitter is received and the frequency hopping synchronization is complete; a frequency hopping synchronization module, configured to, switch the frequency used for receiving the synchronization data from the previous corresponding pre-configured synchronization frequency value to a next corresponding pre-configured synchronization frequency value used for sending the synchronization data by the transmitter when the frequency hopping asynchronization is detected, and receive the synchronization frame at the next corresponding pre-configured synchronization frequency value switched to, until the frequency hopping synchronization is complete A sixth embodiment of the present disclosure provides a receiver, comprising the device for controlling frequency hopping of any one of the technical solutions described above.

According to the technical solution of the present disclosure, switching a frequency used for sending synchronization data to any of a plurality of pre-configured synchronization frequency values when a time slot for sending a synchronization frame is detected to be reached, and sending the synchronization frame at the pre-configured synchronization frequency value switched to; after the previous synchronization frame is sent, switching the frequency used for sending the synchronization data from the previous pre-configured synchronization frequency value to any of the plurality of pre-configured synchronization frequency values, and sending the synchronization frame at the pre-configured synchronization frequency value switched to; after total time slots for sending the synchronization frame is complete, switching a frequency used for sending or receiving data to any of a plurality of pre-configured data frequency values, and sending a data frame at the pre-configured data frequency value switched to when the time slot for sending the data frame is detected to be reached; or receiving the data frame at the pre-configured data frequency value switched to when a time slot for receiving the data frame is detected to be reached; after the previous data frame is sent or received, switching the frequency used for sending or receiving data from the previous pre-configured data frequency value to any of the plurality of pre-configured frequency, and sending the data frame at the pre-configured data frequency value switched to; or, receiving the data frame at the pre-configured data frequency value switched to. Therefore, the operating state of the frequency hopping system is precisely controlled, unpredictable abnormalities of the frequency hopping system may not occur; even when abnormalities of the frequency hopping system occur, reasons for the abnormalities can be easily found on the basis of the precise control of the operating state of the frequency hopping system, thereby improving the controllability of the frequency hopping system, and the stability, the robustness and the data transmission efficiency of the frequency hopping system are further effectively improved.

Additional aspects and advantages of the present disclosure will be set forth in part in the following description, and will be apparent from the description, or may be learned through practice of the present disclosure.

It is to be understood that both the foregoing general description and the following detailed description are exemplary and illustrative only and are not intended to limit the present disclosure.

BRIEF DESCRIPTION OF THE DRAWINGS

The foregoing and/or additional aspects and advantages of the present disclosure will be apparent from and readily understood with reference to the embodiments described hereinafter in combination with the accompanying drawings, wherein.

DETAILED DESCRIPTION OF THE PRESENT DISCLOSURE

Figure 1:
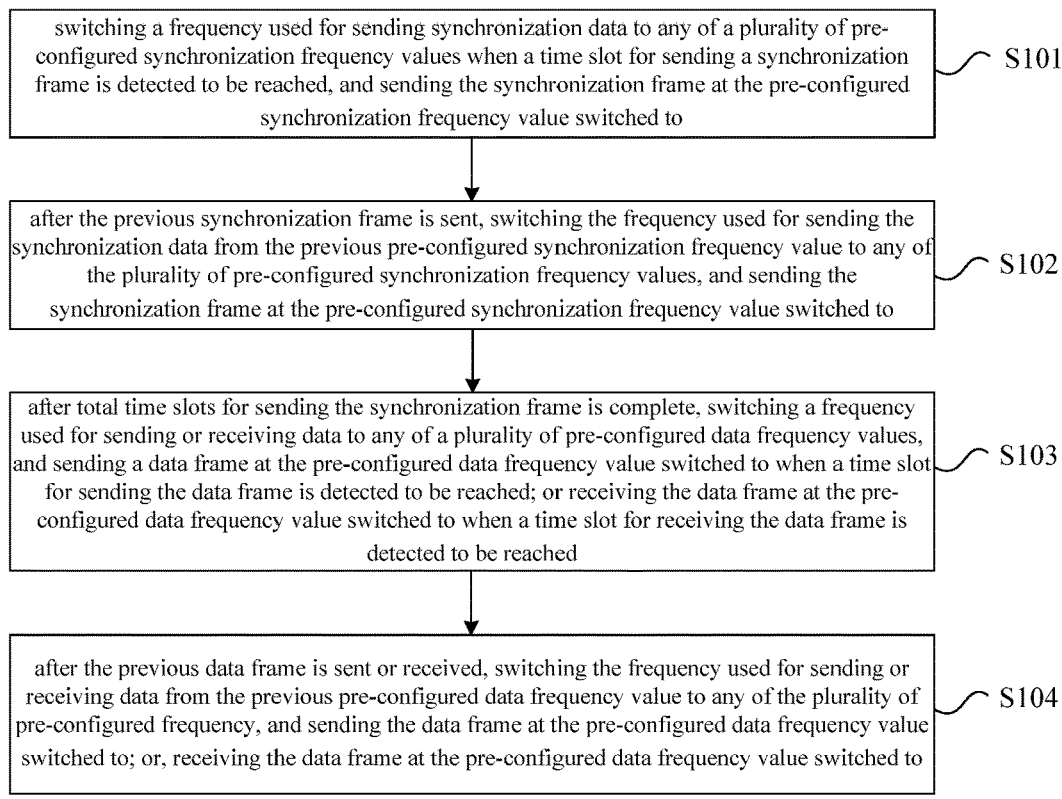
FIG. 1 is a flowchart of a method for controlling frequency hopping according to a first embodiment of the present disclosure.

The embodiments of the present disclosure will be explained in detail below, examples of which are illustrated in the accompanying drawings, wherein like or similar reference numerals refer to the same or similar elements or elements having the same or similar function throughout. The embodiments described below by reference to the drawings are illustrative only and are not to be construed as limiting the present disclosure.

Those skilled in the art will appreciate that, as used herein, the singular forms "a", "an", "the" and may include the plural forms as well, unless expressly stated otherwise. It should be further understood that the term "comprise/include" when used in this description is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may also be present. Furthermore, "connected" or "coupled" as used herein may include wireless connection or wireless coupling. As used herein, the phrase "and/or" includes all or any element and all combinations of one or more of the associated listed items.

It will be understood by those skilled in the art that, unless otherwise defined, all terms (including technical and scientific terms) used herein have the same meaning as commonly understood by one of ordinary skill in the art to which this present disclosure belongs. It should also be understood that terms, such as those defined in commonly used dictionaries, should be interpreted as having a meaning that is consistent with the meaning in the context of the prior art and will not be interpreted in an idealized or overly formal sense unless expressly so defined herein.

FIG. 1 is a flowchart of a method for controlling frequency hopping according to an embodiment of the present disclosure.

It should be noted that the present embodiment is implemented by a transmitter or a host.

The method includes: step S101, switching a frequency used for sending synchronization data to any of a plurality of pre-configured synchronization frequency values when a time slot for sending a synchronization frame is detected to be reached, and sending the synchronization frame at the pre-configured synchronization frequency value switched to; step S102, after the previous synchronization frame is sent, switching the frequency used for sending the synchronization data from the previous pre-configured synchronization frequency value to any of the plurality of pre-configured synchronization frequency values, and sending the synchronization frame at the pre-configured synchronization frequency value switched to; step S103: after total time slots for sending the synchronization frame is complete, switching a frequency used for sending or receiving data to any of a plurality of pre-configured data frequency values, and sending a data frame at the pre-configured data frequency value switched to when a time slot for sending the data frame is detected to be reached; or receiving the data frame at the pre-configured data frequency value switched to when a time slot for receiving the data frame is detected to be reached; step S104: after the previous data frame is sent or received, switching the frequency used for sending or receiving data from the previous pre-configured data frequency value to any of the plurality of pre-configured frequency, and sending the data frame at the pre-configured data frequency value switched to; or, receiving the data frame at the pre-configured data frequency value switched to.

According to the technical solution of the present disclosure, a frequency used for sending synchronization data is switched to any of a plurality of pre-configured synchronization frequency values when a time slot for sending a synchronization frame is detected to be reached, and the synchronization frame is sent at the pre-configured synchronization frequency value switched to; after the previous synchronization frame is sent, the frequency used for sending the synchronization data is switched from the previous pre-configured synchronization frequency value to any of the plurality of pre-configured synchronization frequency values after the previous synchronization frame is sent, and the synchronization frame is sent at the pre-configured synchronization frequency value switched to; after total time slots for sending the synchronization frame is complete, a frequency used for sending or receiving data is switched to any of a plurality of pre-configured data frequency values, and a data frame is sent at the pre-configured data frequency value switched to when a time slot for sending the data frame is detected to be reached; or the data frame is received at the pre-configured data frequency value switched to when a time slot for receiving the data frame is detected to be reached; after the previous data frame is sent or received, the frequency used for sending or receiving data is switched from the previous pre-configured data frequency value to any of the plurality of pre-configured frequency, and the data frame is sent at the pre-configured data frequency value switched to; or, the data frame is received at the pre-configured data frequency value switched to. Therefore, the operating state of the frequency hopping system is precisely controlled, unpredictable abnormalities of the frequency hopping system may not occur; even when abnormalities of the frequency hopping system occur, reasons for the abnormalities can be easily found on the basis of the precise control of the operating state of the frequency hopping system, thereby improving the controllability of the frequency hopping system, and the stability, the robustness and the data transmission efficiency of the frequency hopping system are further effectively improved.

The optional implementation of each step is further described below:

In step S101, a frequency used for sending synchronization data is switched to any of a plurality of pre-configured synchronization frequency values when a time slot for sending a synchronization frame is detected to be reached, and the synchronization frame is sent at the pre-configured synchronization frequency value switched to.

In this step, the synchronization data includes a transmitter frequency hopping starting count value corresponding to a pre-set clock added into the synchronization frame.

Optionally, the method further includes: the synchronization frame is checked before the synchronization frame is sent.

Figure 7:
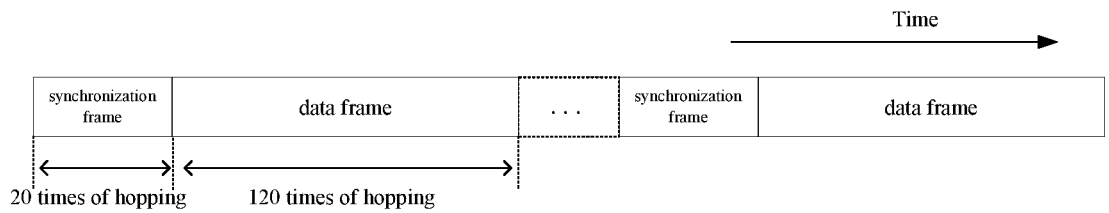
FIG. 7 is a schematic diagram of frame timing of an optional embodiment of the present disclosure.

For example, in a 840.5 MHz-845 MHz data radio station, there are 15 frequency hopping channels, each channel has a bandwidth of 300 k, the air baud rate is 115200Bd, the transmitter or the host transmits data, a receiver or a slave receives data, the time slots for sending and receiving data are allocated to be 1:1, each time slot corresponds to one frequency hopping, in the process of sending or receiving the synchronization frame, each synchronization frequency hopping takes 4 ms, the synchronization frame is sent or received by using 4 frequencies (i.e., frequency points) in the plurality of pre-configured frequencies, the 4 frequencies are used for sending or receiving in turn for 5 rounds, amounting to 20 times of frequency hopping and taking 80 ms in total; in the process of sending or receiving the data frame, each data frequency hopping takes 20 ms, the data frame is sent or received by using 15 frequencies (i.e., frequency points) in the plurality of pre-configured frequencies and selecting one frequency in a time interval of one frequency hopping according to a pseudo-random rule, the 15 frequencies are used for receiving or sending in turn for 8 rounds, amounting to 120 times of frequency hopping and taking 2400 ms in total; the 120 times of frequency hopping is followed by a synchronization frame, and this cycle is repeated accordingly. The frame timing is shown in FIG. 7.

Figure 2:
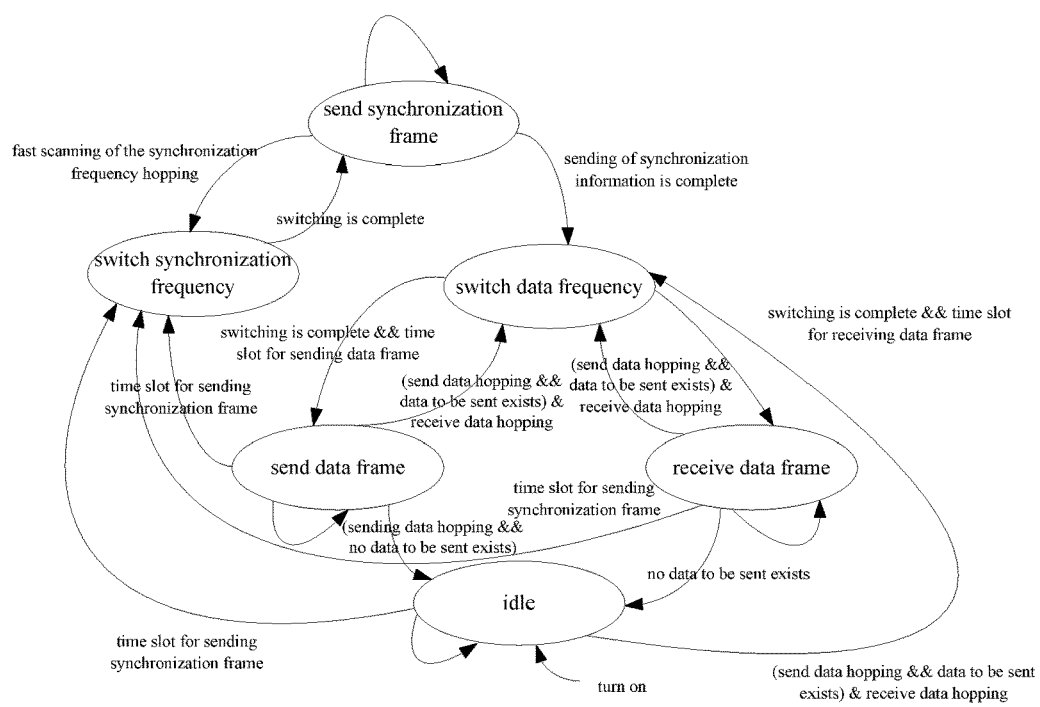
FIG. 2 is a schematic diagram of a process for frequency hopping control according to an optional embodiment of the present disclosure.

The transmitter or the host, as shown in FIG. 2, has the following six states: state 0: an idle state, state 1: a synchronization frame sending state, state 2: a data frame sending state, state 3: a data frame receiving state, state 4: a synchronization frequency switching state, state 5: a data frequency switching state; wherein the first four states are steady operation states of the transmitter, and the last two states are transient operation states of the transmitter. Transition from one state to another occurs under different trigger conditions, and each state keeps itself cycling if the state transition trigger conditions are not fulfilled. The transmitter or the host enters state 0, the idle state, namely a starting state, once turned on, and in this state, the transmitter stands by, not sending or receiving data; when a trigger condition is fulfilled, an interruption happens, and the transmitter wakes up for state transition, transition from state 0 to state 4 or state 5 is rendered; when the time slot for sending the synchronization frame is detected to be reached, the timer generates an interruption, so that the transition from state 0 to state 4, the synchronization frequency switching state, is rendered; the synchronization frame is packed by the transmitter in state 4, a frequency value is selected from the pre-configured synchronization frequency hopping series for frequency switching after the synchronization frame is packed, and the transmitter or the host enters state 1, the synchronization frame sending state, after the switching is done; in state 1, the transmitter sends a synchronization frame through fast scanning, wherein the synchronization frame contains current accurate timing information, namely a transmitter frequency hopping starting count value corresponding to a pre-set clock; and a CRC check is used for the synchronization frame, and transition from state 1 to state 4 or state 5 can be rendered; and after the CRC check is done, the synchronization frame is sent at the pre-configured synchronization frequency value switched to, and the frequency hopping counter carries out frequency hopping counting.

It should be noted that the transmitter provides network synchronization, including frequency hopping synchronization and time-slot synchronization, wherein the time slots includes time slots for sending and time slots for receiving, one frequency hopping or multiple frequency hopping may happen in one time slot, and in this embodiment, one frequency hopping happens in one time slot. The time slot and the frequency hopping align at their margins. After the frequency hopping synchronization is complete, the time slot synchronization is done by using a pre-configured time slot allocation protocol; the transmitter may send and receive data in scheduled time slots.

In step S102, after the previous synchronization frame is sent, the frequency used for sending the synchronization data is switched from the previous pre-configured synchronization frequency value to any of the plurality of pre-configured synchronization frequency values, and the synchronization frame is sent at the pre-configured synchronization frequency value switched to.

For example, after the first synchronization frame is sent according to the above-mentioned method, the frequency used for sending the synchronization data is switched from the previous pre-configured synchronization frequency value to any of the plurality of pre-configured synchronization frequency values, and the synchronization frame is sent at the pre-configured synchronization frequency value switched to; a total of 4 frequencies are selected to send the synchronization frames in turn for 5 rounds, amounting to 20 times of frequency hopping, and during the 20 times of frequency hopping, the transmitter switches between state 1 and state 4 until the 20 frequency hopping synchronization frames are sent out.

In step S103, after total time slots for sending the synchronization frame is complete, a frequency used for sending or receiving data is switched to any of a plurality of pre-configured data frequency values, and a data frame is sent at the pre-configured data frequency value switched to when a time slot for sending the data frame is detected to be reached; or the data frame is received at the pre-configured data frequency value switched to when a time slot for receiving the data frame is detected to be reached.

For example, after 20 frequency hopping synchronization frames are sent out, as shown in FIG. 2, transition from state 1 to state 5, the data frequency switching state, is rendered, in state 5, the transmitter performs packing of the data frame and switching of data frequency values, and transition from state 5 to state 2 or state 3 can be rendered. After the transition to state 5, a data frequency value is selected randomly from a plurality of pre-configured data frequency values, the frequency used for sending or receiving data is switched to the selected data frequency value; after the data frequency value is switched, if the next time slot is detected to be the time slot for sending data, or when the time slot for sending data is detected to be reached transition to state 2, the data frame sending state, is rendered, in state 2, the transmitter sends the data frame, namely the data frame is sent on the data frequency value switched to; transition from state 2 to state 0 or state 4 or state 5 can be rendered; if the next time slot is detected to be the time slot for receiving data, transition to state 3 is rendered when the time slot for receiving the data frame is detected to be reached, state 3 refers to the data frame receiving state, i.e., the data frame is received on the data frequency value switched to, in state 3, the transmitter receives and parses the data frame, and transition from state 3 to state 0 or state 4 or state 5 can be rendered.

In step S104, after the previous data frame is sent or received, the frequency used for sending or receiving data is switched from the previous pre-configured data frequency value to any of the plurality of pre-configured frequency, and the data frame is sent at the pre-configured data frequency value switched to; or, the data frame is received at the pre-configured data frequency value switched to.

Optionally, the step of after the previous data frame is sent or received, switching the frequency used for sending or receiving data from the previous pre-configured data frequency value to any of the plurality of pre-configured frequency, and sending the data frame at the pre-configured data frequency value switched to; or, receiving the data frame at the pre-configured data frequency value switched to comprises: after the previous data frame is sent or received, in a case that the next time slot is detected to be a time slot for sending the data frame and a data frame to be sent exists, switching the frequency used for sending or receiving data from the previous pre-configured data frequency value to any of the plurality of pre-configured frequency values, and sending the data frame when the time slot for sending the data frame is reached; or, after the previous data frame is sent or received, in a case that the next time slot is detected to be a time slot for receiving the data frame, switching the frequency used for sending or receiving data from the previous pre-configured data frequency value to any of the plurality of pre-configured frequency values, and receiving the data frame when the time slot for receiving the data frame is reached.

For example, after the first data frame is sent or received according to the above-mentioned method, if the next time slot is detected to be the time slot for sending the data frame and a data frame to be sent exists, as shown in FIG. 2, the state of the transmitter transits from state 2 or state 3 to state 5, in state 5, the transmitter switches the frequency used for sending or receiving data from the previous pre-configured data frequency value to any of the plurality of pre-configured frequency values, and when the time slot for sending the data frame is detected to be reached, the data frame is sent; that is, transition from state 5 to state 2 is rendered; if the next time slot is detected to be the time slot for receiving the data frame, the transmitter transits from state 2 or state 3 to state 5, in the state 5, the transmitter switches the frequency used for sending or receiving data from the previous pre-configured data frequency value to any of the plurality of pre-configured frequency values, and when the time slot for receiving the data frame is detected to be reached, the data frame is received, namely, transition from state 5 to state 3 is rendered; this cycle is repeated, a total of 15 frequencies are selected for receiving or sending for 8 rounds in turn, amounting to 120 times of frequency hopping; since the data frame lasts for 120 times of frequency hopping, the transmitter always switches back and forth among states 5, 2, 3 and 0 within the 2400 ms of these 120 times of frequency hopping; at the time of the last frequency hopping of the data, i.e., the last time slot of the data time slots, the last frequency hopping must be in state 2, state 3, or state 0.

Optionally, the method further comprises: after the previous data frame is sent or received, in a case that the next time slot is detected to be a time slot for sending the data frame and no data frame to be sent exists, the data frequency is not switched and data frame is not sent until the next time slot is detected to be a time slot for sending the data frame and a data frame to be sent exists, or until the next time slot is detected to be a time slot for receiving the data frame.

For example, after at least one data frame is sent or received according to the above-mentioned method, the transmitter is in state 2 or state 3. If the next time slot is detected to be the time slot for sending the data frame and no frame to be sent exists, the data frequency is not switched and no data frame is sent, i.e., the state of the transmitter transits to state 0 from state 2 or state 3 until the next time slot is detected to be a time slot for sending the data frame and a data frame to be sent exists, or until the next time slot is detected to be a time slot for receiving the data frame; that is, the state of the transmitter transits from state 0 to state 5.

Optionally, the method further comprises: a next time slot for sending the synchronization frame is detected when the total time slots for sending or receiving the data frame is complete.

For example, when the total time slots for sending or receiving the data frame is complete, the timer detects that the next frequency hopping will be a synchronization frequency hopping, so that the state of the transmitter will switch from state 2, state 3, or state 0 to state 4 and begin data sending for synchronization frequency hopping, and this cycle is repeated accordingly.

Figure 3:
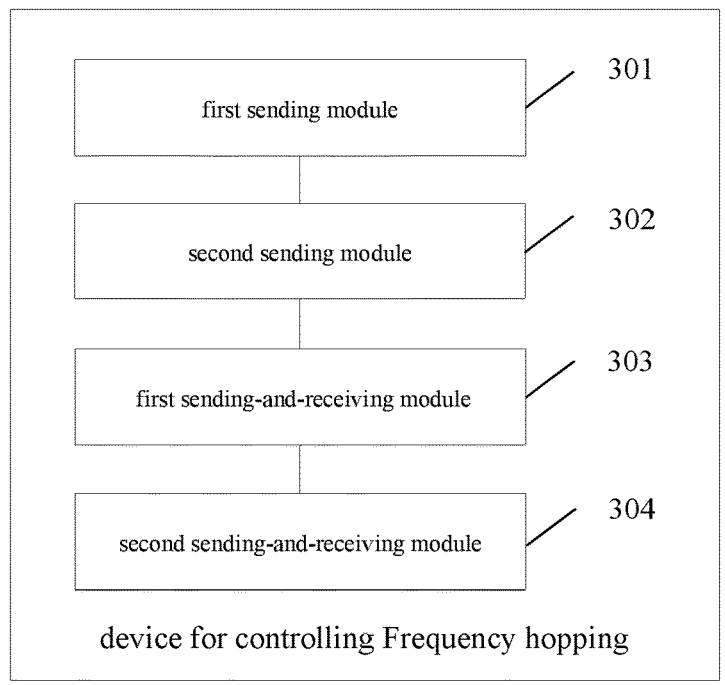
FIG. 3 is a schematic diagram of a structural framework of a device for controlling frequency hopping according to a second embodiment of the present disclosure.

FIG. 3 is a schematic diagram of a structural framework of a device for controlling frequency hopping according to a second embodiment of the present disclosure, as shown in FIG. 3, the device comprises:

A first sending module 301, configured to switch a frequency used for sending synchronization data to any of a plurality of pre-configured synchronization frequency values when a time slot for sending a synchronization frame is detected to be reached, and send the synchronization frame at the pre-configured synchronization frequency value switched to; a second sending module 302, configured to, after the previous synchronization frame is sent, switch the frequency used for sending the synchronization data from the previous pre-configured synchronization frequency value to any of the plurality of pre-configured synchronization frequency values, and send the synchronization frame at the pre-configured synchronization frequency value switched to; a first sending-and-receiving module 303, configured to, after total time slots for sending the synchronization frame is complete, switch a frequency used for sending or receiving data to any of a plurality of pre-configured data frequency values, and send a data frame at the pre-configured data frequency value switched to when a time slot for sending the data frame is detected to be reached; or receive the data frame at the pre-configured data frequency value switched to when a time slot for receiving the data frame is detected to be reached; a second sending-and-receiving module 304, configured to, after the previous data frame is sent or received, switch the frequency used for sending or receiving data from the previous pre-configured data frequency value to any of the plurality of pre-configured frequency, and send the data frame at the pre-configured data frequency value switched to; or, receive the data frame at the pre-configured data frequency value switched to.

The optional implementation of each module is further described below:

The first sending module 301 is configured to switch a frequency used for sending synchronization data to any of a plurality of pre-configured synchronization frequency values when a time slot for sending a synchronization frame is detected to be reached, and send the synchronization frame at the pre-configured synchronization frequency value switched to.

In this module, the synchronization data includes a transmitter frequency hopping starting count value corresponding to a pre-set clock added into the synchronization frame;

Optionally, the device further comprises: a checking module, configured to check the synchronization frame before the synchronization frame is sent.

For example, in a 840.5 MHz-845 MHz data radio station, there are 15 frequency hopping channels, each channel has a bandwidth of 300 k, the air baud rate is 115200Bd, the transmitter or the host transmits data, a receiver or a slave receives data, the time slots for sending and receiving data are allocated to be 1:1, each time slot corresponds to one frequency hopping, in the process of sending or receiving the synchronization frame, each synchronization frequency hopping takes 4 ms, the synchronization frame is sent or received by using 4 frequencies (i.e., frequency points) in the plurality of pre-configured frequencies, the 4 frequencies are used for sending or receiving in turn for 5 rounds, amounting to 20 times of frequency hopping and taking 80 ms in total; in the process of sending or receiving the data frame, each data frequency hopping takes 20 ms, the data frame is sent or received by using 15 frequencies (i.e., frequency points) in the plurality of pre-configured frequencies and selecting one frequency in a time interval of one frequency hopping according to a pseudo-random rule, the 15 frequencies are used for receiving or sending in turn for 8 rounds, amounting to 120 times of frequency hopping and taking 2400 ms in total; the 120 times of frequency hopping is followed by a synchronization frame, and this cycle is repeated accordingly. The frame timing is shown in FIG. 7.

The transmitter or the host, as shown in FIG. 2, has the following six states: state 0: an idle state, state 1: a synchronization frame sending state, state 2: a data frame sending state, state 3: a data frame receiving state, state 4: a synchronization frequency switching state, state 5: a data frequency switching state; wherein the first four states are steady operation states of the transmitter, and the last two states are transient operation states of the transmitter. Transition from one state to another occurs under different trigger conditions, and each state keeps itself cycling if the state transition trigger conditions are not fulfilled. The transmitter or the host enters state 0, the idle state, namely a starting state, once turned on, and in this state, the transmitter stands by, not sending or receiving data; when a trigger condition is fulfilled, an interruption happens, and the transmitter wakes up for state transition, transition from state 0 to state 4 or state 5 is rendered; when the time slot for sending the synchronization frame is detected to be reached by the first sending module 301, the timer generates an interruption, so that the transition from state 0 to state 4, the synchronization frequency switching state, is rendered; the synchronization frame is packed by the transmitter in state 4, a frequency value is selected from the pre-configured synchronization frequency hopping series for frequency switching after the synchronization frame is packed, and the transmitter or the host enters state 1, the synchronization frame sending state, after the switching is done; in state 1, the transmitter sends a synchronization frame through fast scanning, wherein the synchronization frame contains current accurate timing information, namely a transmitter frequency hopping starting count value corresponding to a pre-set clock; and a CRC check is used for the synchronization frame by the checking module, and transition from state 1 to state 4 or state 5 can be rendered; and after the CRC check is done, the synchronization frame is sent at the pre-configured synchronization frequency value switched to, and the frequency hopping counter carries out frequency hopping counting.

It should be noted that the transmitter provides network synchronization, including frequency hopping synchronization and time-slot synchronization, wherein the time slots includes time slots for sending and time slots for receiving, one frequency hopping or multiple frequency hopping may happen in one time slot, and in this embodiment, one frequency hopping happens in one time slot. the time slot and the frequency hopping align at their margins. After the frequency hopping synchronization is complete, the time slot synchronization is done by using a pre-configured time slot allocation protocol; the transmitter may send and receive data in scheduled time slots.

The second sending module 302 is configured to, after the previous synchronization frame is sent, switch the frequency used for sending the synchronization data from the previous pre-configured synchronization frequency value to any of the plurality of pre-configured synchronization frequency values, and send the synchronization frame at the pre-configured synchronization frequency value switched to.

For example, after the first synchronization frame is sent according to the above-mentioned modules, the frequency used for sending the synchronization data is switched from the previous pre-configured synchronization frequency value to any of the plurality of pre-configured synchronization frequency values by the second sending module 302, and the synchronization frame is sent at the pre-configured synchronization frequency value switched to; a total of 4 frequencies are selected to send the synchronization frames in turn for 5 rounds, amounting to 20 times of frequency hopping, and during the 20 times of frequency hopping, the transmitter switches between state 1 and state 4 until the 20 frequency hopping synchronization frames are sent out.

The first sending-and-receiving module 303 is configured to, after total time slots for sending the synchronization frame is complete, switch a frequency used for sending or receiving data to any of a plurality of pre-configured data frequency values, and send a data frame at the pre-configured data frequency value switched to when a time slot for sending the data frame is detected to be reached; or receive the data frame at the pre-configured data frequency value switched to when a time slot for receiving the data frame is detected to be reached.

For example, after 20 frequency hopping synchronization frames are sent out, as shown in FIG. 2, transition from state 1 to state 5, the data frequency switching state, is rendered, in state 5, the transmitter performs packing of the data frame and switching of data frequency values, and transition from state 5 to state 2 or state 3 can be rendered. After the transition to state 5, a data frequency value is selected randomly from a plurality of pre-configured data frequency values by the first sending-and-receiving module 303, the frequency used for sending or receiving data is switched to the selected data frequency value; after the data frequency value is switched, transition to state 2, the data frame sending state, is rendered if the next time slot is detected to be the time slot for sending data or when the time slot for sending data is detected to be reached, in state 2, the transmitter sends the data frame, namely the data frame is sent on the data frequency value switched to; transition from state 2 to state 0 or state 4 or state 5 can be rendered; if the next time slot is detected to be the time slot for receiving data, transition to state 3 is rendered if the next time slot is detected to be the time slot for receiving data when the time slot for receiving the data frame is detected to be reached, state 3 refers to the data frame receiving state, i.e., the data frame is received on the data frequency value switched to, in state 3, the transmitter receives and parses the data frame, and transition from state 3 to state 0 or state 4 or state 5 can be rendered.

The second sending-and-receiving module 304 is configured to, after the previous data frame is sent or received, switch the frequency used for sending or receiving data from the previous pre-configured data frequency value to any of the plurality of pre-configured frequency, and send the data frame at the pre-configured data frequency value switched to; or, receive the data frame at the pre-configured data frequency value switched to.

Optionally, the second sending-and-receiving module includes: a sending unit, configured to, after the previous data frame is sent or received, in a case that the next time slot is detected to be a time slot for sending the data frame and a data frame to be sent exists, switch the frequency used for sending or receiving data from the previous pre-configured data frequency value to any of the plurality of pre-configured frequency values, and send the data frame when the time slot for sending the data frame is reached; and a receiving unit, configured to, after the previous data frame is sent or received, in a case that the next time slot is detected to be a time slot for receiving the data frame, switch the frequency used for sending or receiving data from the previous pre-configured data frequency value to any of the plurality of pre-configured data frequency values, and receive the data frame when the time slot for receiving the data frame is reached.

For example, after the first data frame is sent or received according to the above-mentioned modules, if the next time slot is detected to be the time slot for sending the data frame and a data frame to be sent exists, as shown in FIG. 2, the state of the transmitter transits from state 2 or state 3 to state 5, in state 5, the sending unit switches the frequency used for sending or receiving data from the previous pre-configured data frequency value to any of the plurality of pre-configured frequency values, and when the time slot for sending the data frame is reached, the data frame is sent; that is, transition from state 5 to state 2 is rendered; if the next time slot is detected to be the time slot for receiving the data frame, the transmitter transits from state 2 or state 3 to state 5, in the state 5, the receiving unit switches the frequency used for sending or receiving data from the previous pre-configured data frequency value to any of the plurality of pre-configured frequency values, and when the time slot for receiving the data frame is reached, the data frame is received, namely, transition from state 5 to state 3 of the transmitter is rendered; this cycle is repeated, a total of 15 frequencies are selected for receiving or sending for 8 rounds in turn, amounting to 120 times of frequency hopping; since the data frame lasts for 120 times of frequency hopping, the transmitter always switches back and forth among states 5, 2, 3 and 0 within the 2400 ms of these 120 times of frequency hopping; at the time of the last frequency hopping of the data, i.e., the last time slot of the data time slots, the last frequency hopping must be in state 2, state 3, or state 0.

Optionally, the device further includes: a data frame stop-sending module, configured to, after the previous data frame is sent or received, in a case that the next time slot is detected to be a time slot for sending the data frame and no data frame to be sent exists, not switch the data frequency and not sending data frame until the next time slot is detected to be a time slot for sending the data frame and a data frame to be sent exists, or until the next time slot is detected to be a time slot for receiving the data frame.

For example, after at least one data frame is sent or received according to the above-mentioned modules, the transmitter is in state 2 or state 3. If the next time slot is detected to be the time slot for sending the data frame and no frame to be sent exists, the data frequency is not switched and no data frame is sent by the stop-sending module, i.e., the transmitter transits to state 0 from state 2 or state 3 until the next time slot is detected to be a time slot for sending the data frame and a data frame to be sent exists, or until the next time slot is detected to be a time slot for receiving the data frame; that is, the state of the transmitter transits from state 0 to state 5.

Optionally, the device further includes: a detecting module, configured to detect a next time slot for sending the synchronization frame when total time slots for sending or receiving the data frame is complete.

For example, when the total time slots for sending or receiving the data frame is complete, the detection module of the timer detects that the next frequency hopping will be a synchronization frequency hopping, so that the state of the transmitter will switch from state 2, state 3, or state 0 to state 4 and begin data sending for synchronization frequency hopping, and this cycle is repeated accordingly.

A third embodiment of the present disclosure provides a transmitter, wherein the transmitter includes the device as shown in FIG. 3. Since the above-described embodiment has described optional implementations of the device in detail, further description thereof will be omitted.

Figure 4:
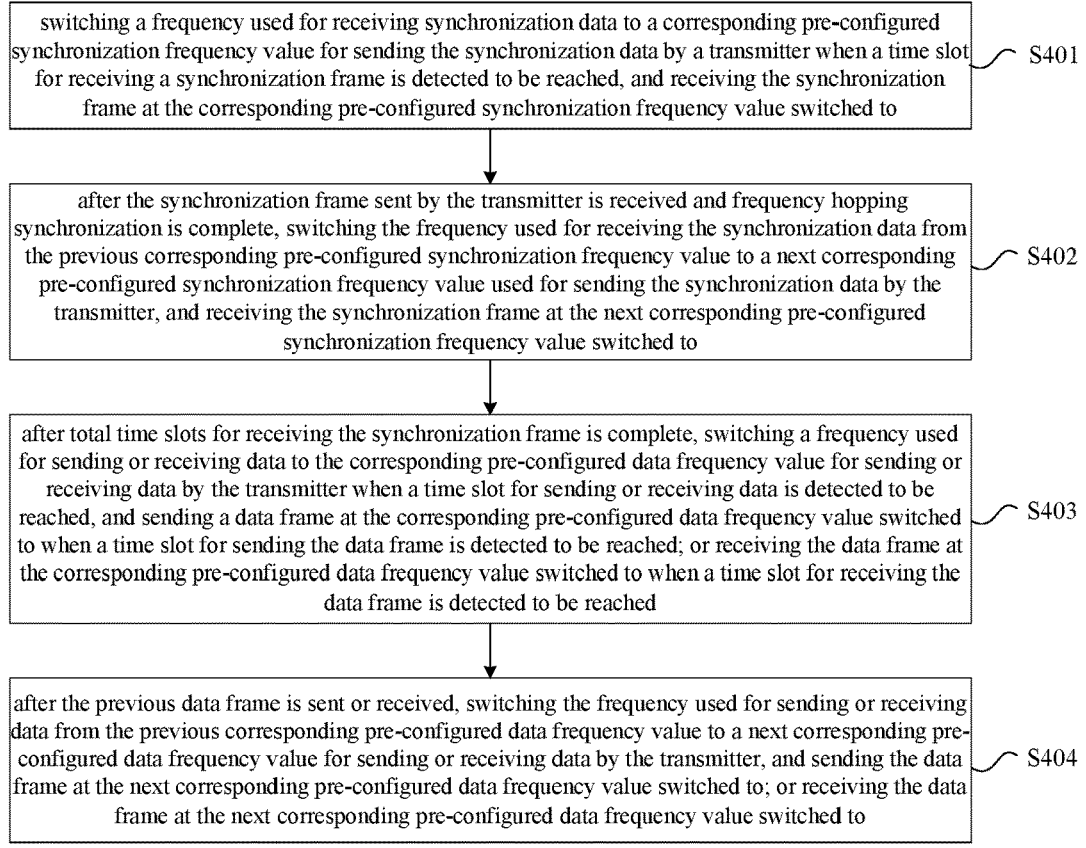
FIG. 4 is a flowchart of a method for controlling frequency hopping according to a fourth embodiment of the present disclosure.

FIG. 4 is a flowchart of a method for controlling frequency hopping according to a fourth embodiment of the present disclosure.

It should be noted that this embodiment is implemented by a receiver or a slave.

The method includes: step S401, switching a frequency used for receiving synchronization data to a corresponding pre-configured synchronization frequency value for sending the synchronization data by a transmitter when a time slot for receiving a synchronization frame is detected to be reached, and receiving the synchronization frame at the corresponding pre-configured synchronization frequency value switched to; step S402, after the synchronization frame sent by the transmitter is received and frequency hopping synchronization is complete, switching the frequency used for receiving the synchronization data from the previous corresponding pre-configured synchronization frequency value to a next corresponding pre-configured synchronization frequency value used for sending the synchronization data by the transmitter, and receiving the synchronization frame at the next corresponding pre-configured synchronization frequency value switched to; step S403, after total time slots for receiving the synchronization frame is complete, switching a frequency used for sending or receiving data to the corresponding pre-configured data frequency value for sending or receiving data by the transmitter when a time slot for sending or receiving data is detected to be reached, and sending a data frame at the corresponding pre-configured data frequency value switched to when a time slot for sending the data frame is detected to be reached; or receiving the data frame at the corresponding pre-configured data frequency value switched to when a time slot for receiving the data frame is detected to be reached; step S404, after the previous data frame is sent or received, switching the frequency used for sending or receiving data from the previous corresponding pre-configured data frequency value to a next corresponding pre-configured data frequency value for sending or receiving data by the transmitter, and sending the data frame at the next corresponding pre-configured data frequency value switched to; or receiving the data frame at the next corresponding pre-configured data frequency value switched to.

The optional implementation of each step is further described below:

In step S401: a frequency used for receiving synchronization data is switched to a corresponding pre-configured synchronization frequency value for sending the synchronization data by a transmitter when a time slot for receiving a synchronization frame is detected to be reached, and the synchronization frame is sent at the corresponding pre-configured synchronization frequency value switched to.

In this step, the synchronization data includes a transmitter frequency hopping starting count value corresponding to a pre-set clock added into the synchronization frame.

Optionally, the method further includes: the synchronization frame is checked after the synchronization frame is received.

The method further includes: switching the frequency used for receiving the synchronization data from the previous corresponding pre-configured synchronization frequency value to a next corresponding pre-configured synchronization frequency value used for sending the synchronization data by the transmitter when the synchronization frame sent by the transmitter is received and frequency hopping synchronization is not complete, and receiving the synchronization frame at the next corresponding pre-configured synchronization frequency value switched to, until the frequency hopping synchronization is complete.

Figure 5:
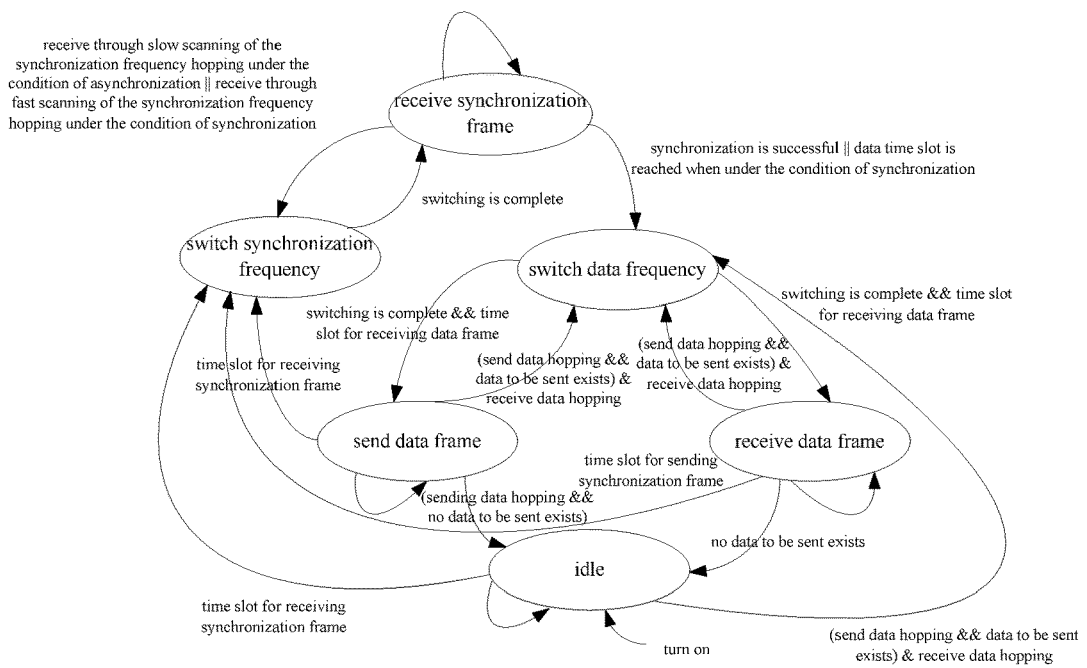
FIG. 5 is a schematic diagram of a process for frequency hopping control according to an optional embodiment of the present disclosure.

For example, according to the first embodiment, the receiver or the slave, as shown in FIG. 5, has the following six states: state 0: an idle state, state 1: a synchronization frame receiving state, state 2: a data frame sending state, state 3: a data frame receiving state, state 4: a synchronization frequency switching state, state 5: a data frequency switching state; wherein the first four states are steady operation states of the receiver, and the last two states are transient operation states of the receiver. Transition from one state to another occurs under different trigger conditions, and each state keeps itself cycling if the state transition trigger conditions are not fulfilled. The receiver or the slave enters state 0, the idle state, namely a starting state, once turned on, and in this state, the receiver stands by, not receiving or sending data; when a trigger condition is fulfilled, an interruption happens, and the receiver wakes up for state transition, transition from state 0 to state 4 or state 5 is rendered; when the time slot for receiving the synchronization frame is detected to be reached, the timer generates an interruption, so that the transition from state 0 to state 4, the synchronization frequency switching state, is rendered; the receiver unpacks the synchronization frame and switches the synchronization frequency value in state 4, and transition from state 4 to state 1 is rendered. In state 4, a synchronization frequency value is selected by the receiver from the pre-configured synchronization frequency hopping series for frequency switching, the selection rule of the synchronization frequency value is the same as that of the synchronization frequency value for the transmitter, and after the switching of the synchronization frequency value is complete, the synchronization frame is received on the synchronization frequency value switched to; transition to state 1, the synchronization frame receiving state, is rendered, in state 1, the receiver receives the synchronization frame through slow scanning or fast scanning, timing information in the received synchronization frame, i.e., the transmitter frequency hopping starting count value corresponding to the pre-set clock, needs to be parsed, the received synchronization frame is subjected to local timing correction on the basis of the timing information after experiencing the CRC checking and turning out to be correct, and synchronization with the host is kept; transition from state 1 to state 4 or state 5 can be rendered, under the condition of asynchronization, after the receiver receives the synchronization frame through slow scanning of the synchronization frequency hopping, transition to state 4 is rendered; under the condition of synchronization, after the transmitter receives the synchronization frame through fast scanning of the synchronization frequency hopping, transition to state 4 is rendered, if receiving through slow scanning, the transmitter always switches between state 1 and state 4 without jumping to other states, and only after the receiver detects the synchronization frame of the host and corrects the timing information of itself, receiving the synchronization frame through fast scanning can be performed, and at the meantime, the hopping counter starts counting.

It should be noted that the receiver has to keep frequency hopping synchronization and time-slot synchronization with the host. The receiver may send and receive data in scheduled time slots.

In step S402, after the synchronization frame sent by the transmitter is received and frequency hopping synchronization is complete, the frequency used for receiving the synchronization data is switched from the previous corresponding pre-configured synchronization frequency value to a next corresponding pre-configured synchronization frequency value used for sending the synchronization data by the transmitter, and the synchronization frame is sent at the next corresponding pre-configured synchronization frequency value switched to.

Optionally, the method further includes: before the total time slot for receiving the synchronization frame is complete, frequency hopping asynchronization is detected after the synchronization frame sent by the transmitter is received and the frequency hopping synchronization is complete; the frequency used for receiving the synchronization data is switched from the previous corresponding pre-configured synchronization frequency value to a next corresponding pre-configured synchronization frequency value used for sending the synchronization data by the transmitter when the frequency hopping asynchronization is detected, and the synchronization frame is received at the next corresponding pre-configured synchronization frequency value switched to, until the frequency hopping synchronization is complete.

For example, after the synchronization frame sent by the transmitter is received and the frequency hopping synchronization is complete according to the above-mentioned method, the frequency used for receiving the synchronization data is switched from the previous corresponding pre-configured synchronization frequency value to a next corresponding pre-configured synchronization frequency value, the synchronization frequency value switching rule is the same as that for the transmitter, and the synchronization frame is received at the pre-configured synchronization frequency value switched to; a total of 4 frequencies are selected to receive the synchronization frames in turn for 5 rounds, amounting to 20 times of frequency hopping, and during the 20 times of frequency hopping, the receiver switches between state 1 and state 4 until the 20 frequency hopping synchronization frames are received. Before the total time slot for receiving the synchronization frame is complete, frequency hopping asynchronization is subjected to detection after frequency hopping synchronization is complete; when the frequency hopping asynchronization is detected, the synchronization frame is received according to a mode under frequency hopping asynchronization, until the frequency hopping synchronization is complete.

In step S403, after total time slots for receiving the synchronization frame is complete, a frequency used for sending or receiving data is switched to the corresponding pre-configured data frequency value for sending or receiving data by the transmitter when a time slot for sending or receiving data is detected to be reached, and a data frame is sent at the corresponding pre-configured data frequency value switched to when the time slot for sending the data frame is detected to be reached; or the data frame is received at the corresponding pre-configured data frequency value switched to when a time slot for receiving the data frame is detected to be reached.

For example, after 20 frequency hopping synchronization frames are received, as shown in FIG. 5, and when the time slot for sending or receiving data is detected to be reached, transition from state 1 to state 5, the data frequency switching state, is rendered, in state 5, the receiver performs packing of the data frame and switching of data frequency, and transition from state 5 to state 2 or state 3 can be rendered. After the transition to state 5, the data frequency value is switched, the switching rule of the data frequency is the same as that for the transmitter; after the data frequency value is switched, if the next time slot is detected to be the time slot for sending data or when the time slot for sending data is detected to be reached, transition to state 2, the data frame sending state, is rendered, in state 2, the receiver sends the data frame, namely the data frame is sent on the data frequency value switched to; transition from state 2 to state 0 or state 4 or state 5 can be rendered; if the next time slot is detected to be the time slot for receiving data, transition to state 3, the data frame receiving state, is rendered, namely, the data frame is received at the data frequency value switched to, in state 3, the receiver receives and parses the data frame, and transition from state 3 to state 0 or state 4 or state 5 can be rendered.

In step S404, after the previous data frame is sent or received, the frequency used for sending or receiving data is switched from the previous corresponding pre-configured data frequency value to a next corresponding pre-configured data frequency value for sending or receiving data by the transmitter, and the data frame is sent at the next corresponding pre-configured data frequency value switched to; or the data frame is received at the next corresponding pre-configured data frequency value switched to.

Optionally, the step of after the previous data frame is sent or received, switching the frequency used for sending or receiving data from the previous corresponding pre-configured data frequency value to a next corresponding pre-configured data frequency value for sending or receiving data by the transmitter, and sending the data frame at the next corresponding pre-configured data frequency value switched to; or receiving the data frame at the next corresponding pre-configured data frequency value switched to comprises: after the previous data frame is sent or received, in a case that the next time slot is detected to be the time slot for sending the data frame and a data frame to be sent exists, switching the frequency for sending or receiving data from the previous corresponding pre-configured data frequency value to the next corresponding pre-configured data frequency value for sending or receiving data by the transmitter, and sending the data frame when the time slot for sending the data frame is reached; or after the previous data frame is sent or received, in a case that the next time slot is detected to be a time slot for receiving the data frame, switching the frequency for sending or receiving data from the previous corresponding pre-configured data frequency value to the next corresponding pre-configured data frequency value for sending or receiving data by the transmitter, and receiving the data frame when the time slot for receiving the data frame is reached.

For example, after the first data frame is sent or received according to the above-mentioned method, if the next time slot is detected to be the time slot for sending the data frame and a data frame to be sent exists, as shown in FIG. 5, the state of the receiver transits from state 2 or state 3 to state 5, in state 5, the receiver switches the frequency used for sending or receiving data from the previous corresponding pre-configured data frequency value to a next corresponding pre-configured frequency value, the data frequency value switching rule is the same as that for the transmitter, and when the time slot for sending the data frame is detected to be reached, the data frame is sent; that is, transition from state 5 to state 2 of the receiver is rendered; if the next time slot is detected to be the time slot for receiving the data frame, the receiver transits from state 2 or state 3 to state 5, in the state 5, the receiver switches the frequency used for sending or receiving data from the previous corresponding pre-configured data frequency value to a next corresponding pre-configured frequency value, the data frequency value switching rule is the same as that for the transmitter, and when the time slot for receiving the data frame is detected to be reached, the data frame is received, namely, transition from state 5 to state 3 of the receiver is rendered; this cycle is repeated, a total of 15 frequencies are selected for receiving or sending for 8 rounds in turn, amounting to 120 times of frequency hopping; since the data frame lasts for 120 times of frequency hopping, the receiver always switches back and forth among states 5, 2, 3 and 0 within the 2400 ms of these 120 times of frequency hopping; at the time of the last frequency hopping of the data, i.e., the last time slot of the data time slots, the last frequency hopping must be in state 2, state 3, or state 0.

Optionally, the method further includes: after the previous data frame is sent or received, in a case that the next time slot is detected to be a time slot for sending the data frame and no data frame to be sent exists, the data frequency is not switched and data frame is not sent until the next time slot is detected to be the time slot for sending the data frame and a data frame to be sent exists, or until the next time slot is detected to be the time slot for receiving the data frame.

For example, after at least one data frame is sent or received according to the above-mentioned method, the receiver is in state 2 or state 3, If the next time slot is detected to be the time slot for sending the data frame and no frame to be sent exists, the data frequency is not switched and no data frame is sent, i.e., the state of the receiver transits to state 0, the idle state, from state 2 or state 3 until the next time slot is detected to be a time slot for sending the data frame and a data frame to be sent exists, or until the next time slot is detected to be a time slot for receiving the data frame; that is, the state of the receiver transits from state 0 to state 5.

Optionally, the method further includes: a next time slot for receiving the synchronization frame is detected when the total time slots for sending or receiving the data frame is complete.

For example, when the total time slots for sending or receiving the data frame is complete, the timer detects that the next frequency hopping will be a synchronization frequency hopping, so that the state of the receiver will switch from state 2, state 3, or state 0 to state 4 and begin fast scanning receiving for synchronization frequency hopping, and this cycle is repeated accordingly.

Figure 6:
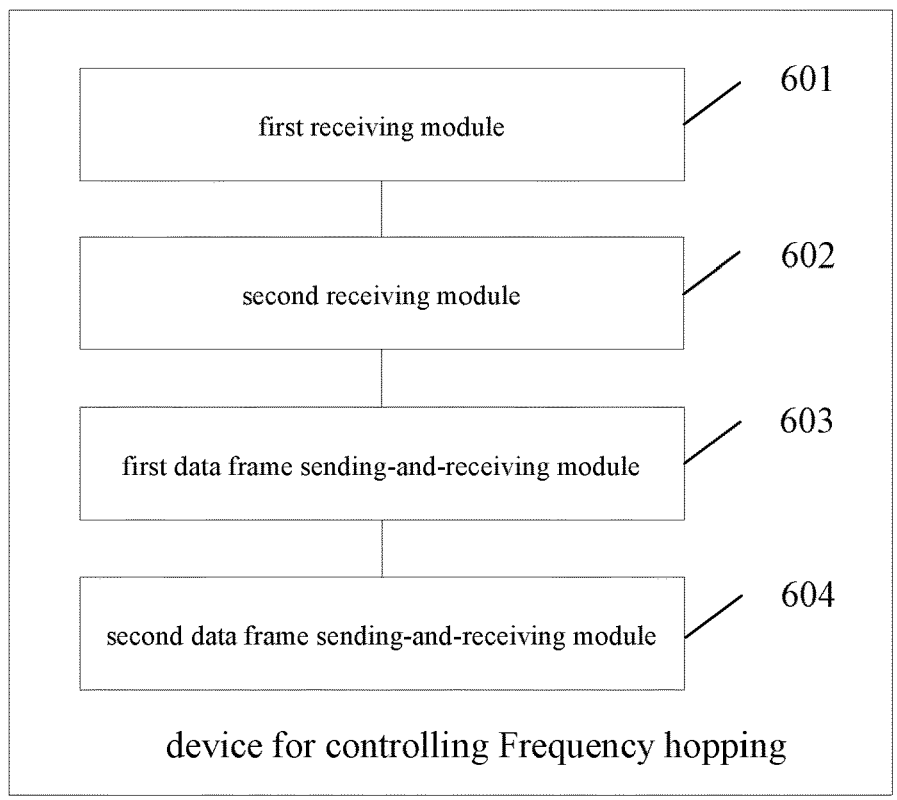
FIG. 6 is a schematic diagram of a structural framework of a device for controlling frequency hopping according to a fifth embodiment of the present disclosure.

FIG. 6 is a schematic diagram of a structural framework of a device for controlling frequency hopping according to a fifth embodiment of the present disclosure, as shown in FIG. 3, the device comprises:

A first receiving module 601, configured to switch a frequency used for receiving synchronization data to a corresponding pre-configured synchronization frequency value for sending the synchronization data by a transmitter when a time slot for receiving a synchronization frame is detected to be reached, and receive the synchronization frame at the corresponding pre-configured synchronization frequency value switched to; a second receiving module 602, configured to, after the synchronization frame sent by the transmitter is received and frequency hopping synchronization is complete, switch the frequency used for receiving the synchronization data from the previous corresponding pre-configured synchronization frequency value to a next corresponding pre-configured synchronization frequency value used for sending the synchronization data by the transmitter, and receive the synchronization frame at the next corresponding pre-configured synchronization frequency value switched to; a first data frame sending-and-receiving module 603, configured to, after total time slots for receiving the synchronization frame is complete, switch a frequency used for sending or receiving data to the corresponding pre-configured data frequency value for sending or receiving data by the transmitter when a time slot for sending or receiving data is detected to be reached, and send a data frame at the corresponding pre-configured data frequency value switched to when the time slot for sending the data frame is detected to be reached; or receive the data frame at the corresponding pre-configured data frequency value switched to when a time slot for receiving the data frame is detected to be reached; a second data frame sending-and-receiving module 604, configured to, after the previous data frame is sent or received, switch the frequency used for sending or receiving data from the previous corresponding pre-configured data frequency value to a next corresponding pre-configured data frequency value for sending or receiving data by the transmitter, and send the data frame at the next corresponding pre-configured data frequency value switched to; or receive the data frame at the next corresponding pre-configured data frequency value switched to.

The optional implementation of each module is further described below:

The first receiving module 601 is configured to switch a frequency used for receiving synchronization data to a corresponding pre-configured synchronization frequency value for sending the synchronization data by a transmitter when a time slot for receiving a synchronization frame is detected to be reached, and receiving the synchronization frame at the corresponding pre-configured synchronization frequency value switched to.

In this module, the synchronization data includes a transmitter frequency hopping starting count value corresponding to a pre-set clock added into the synchronization frame;

Optionally, the device further includes a synchronization frame checking module, configured to check the synchronization frame after the synchronization frame is received.

The device further includes: a third receiving module, configured to, switch the frequency used for receiving the synchronization data from the previous corresponding pre-configured synchronization frequency value to a next corresponding pre-configured synchronization frequency value used for sending the synchronization data by the transmitter when the synchronization frame sent by the transmitter is received and frequency hopping synchronization is not complete, and receive the synchronization frame at the next corresponding pre-configured synchronization frequency value switched to, until the frequency hopping synchronization is complete.

For example, according to the second embodiment, the receiver or the slave, as shown in FIG. 5, has the following six states: state 0: an idle state, state 1: a synchronization frame receiving state, state 2: a data frame sending state, state 3: a data frame receiving state, state 4: a synchronization frequency switching state, state 5: a data frequency switching state; wherein the first four states are steady operation states of the receiver, and the last two states are transient operation states of the receiver. Transition from one state to another occurs under different trigger conditions, and each state keeps itself cycling if the state transition trigger conditions are not fulfilled. The receiver or the slave enters state 0, the idle state, namely a starting state, once turned on, and in this state, the receiver stands by, not receiving or sending data; when a trigger condition is fulfilled, an interruption happens, and the receiver wakes up for state transition, transition from state 0 to state 4 or state 5 is rendered; when the time slot for receiving the synchronization frame is detected to be reached, the timer generates an interruption, so that the transition from state 0 to state 4, the synchronization frequency switching state, is rendered; the receiver unpacks the synchronization frame and switches the synchronization frequency value in state 4, and transition from state 4 to state 1 is rendered. In state 4, a synchronization frequency value is selected by the first receiving module 601 of the receiver from the pre-configured synchronization frequency hopping series for frequency switching, the selection rule of the synchronization frequency value is the same as that of the synchronization frequency value for the transmitter, and after the switching of the synchronization frequency value is complete, the synchronization frame is received on the synchronization frequency value switched to; transition to state 1, the synchronization frame receiving state, is rendered, in state 1, the receiver receives the synchronization frame through slow scanning or fast scanning, timing information in the received synchronization frame, i.e., the transmitter frequency hopping starting count value corresponding to the pre-set clock, needs to be parsed, the received synchronization frame is subjected to local timing correction on the basis of the timing information after experiencing the CRC checking and turning out to be correct, and synchronization with the host is kept; transition from state 1 to state 4 or state 5 can be rendered, under the condition of asynchronization, after the receiver receives the synchronization frame through slow scanning of the synchronization frequency hopping, transition to state 4 is rendered; under the condition of synchronization, after the transmitter receives the synchronization frame through fast scanning of the synchronization frequency hopping, transition to state 4 is rendered, if receiving through slow scanning, the transmitter always switches between state 1 and state 4 without jumping to other states, and only after the receiver detects the synchronization frame of the host and corrects the timing information of itself, receiving the synchronization frame through fast scanning can be performed, and at the meantime, the hopping counter starts counting.

It should be noted that the receiver has to keep frequency hopping synchronization and time-slot synchronization with the host. The receiver may send and receive data in scheduled time slots.

The second receiving module 602 is configured to after the synchronization frame sent by the transmitter is received and frequency hopping synchronization is complete, switch the frequency used for receiving the synchronization data from the previous corresponding pre-configured synchronization frequency value to a next corresponding pre-configured synchronization frequency value used for sending the synchronization data by the transmitter, and receive the synchronization frame at the next corresponding pre-configured synchronization frequency value switched to.

Optionally, the device further includes: a frequency hopping asynchronization detection module, configured to, before the total time slot for receiving the synchronization frame is complete, detect frequency hopping asynchronization after the synchronization frame sent by the transmitter is received and the frequency hopping synchronization is complete; a frequency hopping synchronization module, configured to, switch the frequency used for receiving the synchronization data from the previous corresponding pre-configured synchronization frequency value to a next corresponding pre-configured synchronization frequency value used for sending the synchronization data by the transmitter when the frequency hopping asynchronization is detected, and receive the synchronization frame at the next corresponding pre-configured synchronization frequency value switched to, until the frequency hopping synchronization is complete.

For example, after the synchronization frame sent by the transmitter is received and the frequency hopping synchronization is complete according to the above-mentioned module, the frequency used for receiving the synchronization data is switched by the second receiving module 602 from the previous corresponding pre-configured synchronization frequency value to a next corresponding pre-configured synchronization frequency value, the synchronization frequency value switching rule is the same as that for the transmitter, and the synchronization frame is received at the pre-configured synchronization frequency value switched to; a total of 4 frequencies are selected to receive the synchronization frames in turn for 5 rounds, amounting to 20 times of frequency hopping, and during the 20 times of frequency hopping, the receiver switches between state 1 and state 4 until the 20 frequency hopping synchronization frames are received. Before the total time slot for receiving the synchronization frame is complete, frequency hopping asynchronization is subjected to detection by the frequency hopping asynchronization detection module after frequency hopping synchronization is complete; when the frequency hopping asynchronization is detected by the frequency hopping asynchronization detection module, the synchronization frame is received according to a mode under frequency hopping asynchronization, until the frequency hopping synchronization is complete.

The first data frame sending-and-receiving module 603 is configured to, after total time slots for receiving the synchronization frame is complete, switch the frequency used for sending or receiving data to the corresponding pre-configured data frequency value for sending or receiving data by the transmitter when a time slot for sending or receiving data is detected to be reached, and sending a data frame at the corresponding pre-configured data frequency value switched to when the time slot for sending the data frame is detected to be reached; or receiving the data frame at the corresponding pre-configured data frequency value switched to when a time slot for receiving the data frame is detected to be reached.

For example, after 20 frequency hopping synchronization frames are received, as shown in FIG. 5, and when the time slot for sending or receiving data is detected to be reached, transition from state 1 to state 5, the data frequency switching state, is rendered, in state 5, the receiver performs packing of the data frame, and the first data frame sending-and-receiving module 603 switches of data frequency, and transition from state 5 to state 2 or state 3 can be rendered. After the transition to state 5, the data frequency value is switched by the first data frame sending-and-receiving module 603, the switching rule of the data frequency is the same as that for the transmitter; after the data frequency value is switched, if the next time slot is detected to be the time slot for sending data or when the time slot for sending data is detected to be reached, transition to state 2, the data frame sending state, is rendered, in state 2, the receiver sends the data frame, namely the data frame is sent on the data frequency value switched to; transition from state 2 to state 0 or state 4 or state 5 can be rendered; if the next time slot is detected to be the time slot for receiving data, transition to state 3, the data frame receiving state, is rendered, namely, the data frame is received at the data frequency value switched to, in state 3, the receiver receives and parses the data frame, and transition from state 3 to state 0 or state 4 or state 5 can be rendered.

The second data frame sending-and-receiving module 604 is configured to, after the previous data frame is sent or received, switch the frequency used for sending or receiving data from the previous corresponding pre-configured data frequency value to a next corresponding pre-configured data frequency value for sending or receiving data by the transmitter, and send the data frame at the next corresponding pre-configured data frequency value switched to; or receive the data frame at the next corresponding pre-configured data frequency value switched to.

Optionally, the second data frame sending-and-receiving module includes: a data frame sending unit, configured to, after the previous data frame is sent or received, in a case that the next time slot is detected to be the time slot for sending the data frame and a data frame to be sent exists, switch the frequency for sending or receiving data from the previous corresponding pre-configured data frequency value to the next corresponding pre-configured data frequency value for sending or receiving data by the transmitter, and send the data frame when the time slot for sending the data frame is reached; a data frame receiving unit, configured to, after the previous data frame is sent or received, in a case that the next time slot is detected to be a time slot for receiving the data frame, switch the frequency for sending or receiving data from the previous corresponding pre-configured data frequency value to the next corresponding pre-configured data frequency value for sending or receiving data by the transmitter, and receive the data frame when the time slot for receiving the data frame is reached.

For example, after the first data frame is sent or received according to the above-mentioned module, if the next time slot is detected to be the time slot for sending the data frame and a data frame to be sent exists, as shown in FIG. 5, the state of the receiver transits from state 2 or state 3 to state 5, in state 5, the data frame sending unit of the receiver switches the frequency used for sending or receiving data from the previous corresponding pre-configured data frequency value to a next corresponding pre-configured frequency value, the data frequency value switching rule is the same as that for the transmitter, and when the time slot for sending the data frame is detected to be reached, the data frame is sent; that is, transition from state 5 to state 2 of the receiver is rendered; if the next time slot is detected to be the time slot for receiving the data frame, the receiver transits from state 2 or state 3 to state 5, in the state 5, the data frame receiving unit of the receiver switches the frequency used for sending or receiving data from the previous corresponding pre-configured data frequency value to a next corresponding pre-configured frequency value, the data frequency value switching rule is the same as that for the transmitter, and when the time slot for receiving the data frame is detected to be reached, the data frame is received, namely, transition from state 5 to state 3 of the receiver is rendered; this cycle is repeated, a total of 15 frequencies are selected for receiving or sending for 8 rounds in turn, amounting to 120 times of frequency hopping; since the data frame lasts for 120 times of frequency hopping, the receiver always switches back and forth among states 5, 2, 3 and 0 within the 2400 ms of these 120 times of frequency hopping; at the time of the last frequency hopping of the data, i.e., the last time slot of the data time slots, the last frequency hopping must be in state 2, state 3, or state 0.

Optionally, the device further includes: a data frame stop-sending module, configured to after the previous data frame is sent or received, in a case that the next time slot is detected to be a time slot for sending the data frame and no data frame to be sent exists, not switch the data frequency and not send data frame until the next time slot is detected to be the time slot for sending the data frame and a data frame to be sent exists, or until the next time slot is detected to be the time slot for receiving the data frame.

For example, after at least one data frame is sent or received according to the above-mentioned module, the receiver is in state 2 or state 3, If the next time slot is detected to be the time slot for sending the data frame and no frame to be sent exists, the data frequency is not switched and no data frame is sent by the data frame stop-sending module, i.e., the state of the receiver transits to state 0, the idle state, from state 2 or state 3 until the next time slot is detected to be a time slot for sending the data frame and a data frame to be sent exists, or until the next time slot is detected to be a time slot for receiving the data frame; that is, the state of the receiver transits from state 0 to state 5.

Optionally, the device further includes: a time slot detection module, configured to detect a next time slot for receiving the synchronization frame when the total time slots for sending or receiving the data frame is complete.

For example, when the total time slots for sending or receiving the data frame is complete, the time slot detection module of the timer detects that the next frequency hopping will be a synchronization frequency hopping, so that the state of the receiver will switch from state 2, state 3, or state 0 to state 4 and begin fast scanning receiving for synchronization state of the hopping, and this cycle is repeated accordingly.

A sixth embodiment of the present disclosure provides a receiver, wherein the receiver includes the device as shown in FIG. 6. Since the above-described embodiment has described optional implementations of the device in detail, further description thereof will be omitted.

After the data radio station is implemented according to the technical solution of the present disclosure, the transmitter or the receiver is always in the above-mentioned several states, when a problem occurs, the source of the problem can be easily found, so that the controllability of the frequency hopping system is improved. Because the frequency hopping system is always in the above several states, it will not jump to some unforeseen abnormal states. In addition, the timing information of the transmitter is completely unaffected by the receiver, and the receiver is unilaterally kept in synchronization with the transmitter, thereby further improving the stability and robustness of the frequency hopping system. Moreover, the transmitter or receiver can make full use of the data transmission time by advantage of the accurate timing of the timer to improve the efficiency of data transmission.

Figure 8:
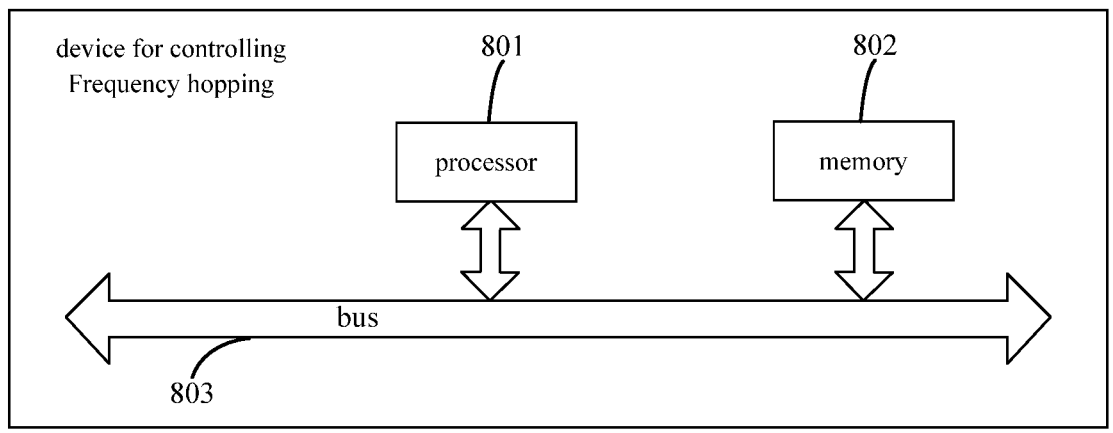
FIG. 8 is a schematic diagram of a structural framework of a device for controlling frequency hopping according to a seventh embodiment of the present disclosure.

FIG. 8 is a schematic diagram of a structural framework of a device for controlling frequency hopping according to a seventh embodiment of the present disclosure.

Referring to FIG. 8, the device includes: at least one processor 801, and at least one memory 802 communicatively connected to the processor 801, wherein:

the memory 802 stores program instructions that can be executed by the processor 801, and the processor 801 invokes the program instructions to implement the method provided by the first embodiment shown in FIG. 1 and related embodiments thereof, for example, the method includes:

switching a frequency used for sending synchronization data to any of a plurality of pre-configured synchronization frequency values when a time slot for sending a synchronization frame is detected to be reached, and sending the synchronization frame at the pre-configured synchronization frequency value switched to;

after the previous synchronization frame is sent, switching the frequency used for sending the synchronization data from the previous pre-configured synchronization frequency value to any of the plurality of pre-configured synchronization frequency values, and sending the synchronization frame at the pre-configured synchronization frequency value switched to;

after total time slots for sending the synchronization frame is complete, switching a frequency used for sending or receiving data to any of a plurality of pre-configured data frequency values, and sending a data frame at the pre-configured data frequency value switched to when a time slot for sending the data frame is detected to be reached; or receiving the data frame at the pre-configured data frequency value switched to when a time slot for receiving the data frame is detected to be reached; and after the previous data frame is sent or received, switching the frequency used for sending or receiving data from the previous pre-configured data frequency value to any of the plurality of pre-configured frequency, and sending the data frame at the pre-configured data frequency value switched to; or, receiving the data frame at the pre-configured data frequency value switched to.

Referring to FIG. 8, in the present embodiment, the processor 801 and the memory 802 communicate with each other via a bus 803.

An eighth embodiment of the present disclosure discloses a transmitter, wherein the transmitter includes the device as shown in FIG. 8. Since the above-described embodiment has described optional implementations of the device in detail, further description thereof will be omitted.

A ninth embodiment of the present disclosure discloses a computer program product, the computer program product includes a computer program stored on a non-transitory computer-readable storage medium, the computer program includes program instructions which, when executed by a computer, cause the computer to perform the method provided by the first embodiment shown in FIG. 1 and related embodiments thereof, for example, the method includes:

switching a frequency used for sending synchronization data to any of a plurality of pre-configured synchronization frequency values when a time slot for sending a synchronization frame is detected to be reached, and sending the synchronization frame at the pre-configured synchronization frequency value switched to;

after the previous synchronization frame is sent, switching the frequency used for sending the synchronization data from the previous pre-configured synchronization frequency value to any of the plurality of pre-configured synchronization frequency values, and sending the synchronization frame at the pre-configured synchronization frequency value switched to;

after total time slots for sending the synchronization frame is complete, switching a frequency used for sending or receiving data to any of a plurality of pre-configured data frequency values, and sending a data frame at the pre-configured data frequency value switched to when a time slot for sending the data frame is detected to be reached; or receiving the data frame at the pre-configured data frequency value switched to when a time slot for receiving the data frame is detected to be reached;

after the previous data frame is sent or received, switching the frequency used for sending or receiving data from the previous pre-configured data frequency value to any of the plurality of pre-configured frequency, and sending the data frame at the pre-configured data frequency value switched to; or, receiving the data frame at the pre-configured data frequency value switched to.

A tenth embodiment of the present disclosure discloses a non-transient computer-readable storage medium, the non-transitory computer-readable storage medium stores computer instructions that cause a computer to perform the method provided by the first embodiment shown in FIG. 1 and related embodiments thereof, for example, the method includes:

switching a frequency used for sending synchronization data to any of a plurality of pre-configured synchronization frequency values when a time slot for sending a synchronization frame is detected to be reached, and sending the synchronization frame at the pre-configured synchronization frequency value switched to;

after the previous synchronization frame is sent, switching the frequency used for sending the synchronization data from the previous pre-configured synchronization frequency value to any of the plurality of pre-configured synchronization frequency values, and sending the synchronization frame at the pre-configured synchronization frequency value switched to;

after total time slots for sending the synchronization frame is complete, switching a frequency used for sending or receiving data to any of a plurality of pre-configured data frequency values, and sending a data frame at the pre-configured data frequency value switched to when a time slot for sending the data frame is detected to be reached; or receiving the data frame at the pre-configured data frequency value switched to when a time slot for receiving the data frame is detected to be reached;

after the previous data frame is sent or received, switching the frequency used for sending or receiving data from the previous pre-configured data frequency value to any of the plurality of pre-configured frequency, and sending the data frame at the pre-configured data frequency value switched to; or, receiving the data frame at the pre-configured data frequency value switched to.

Figure 9:
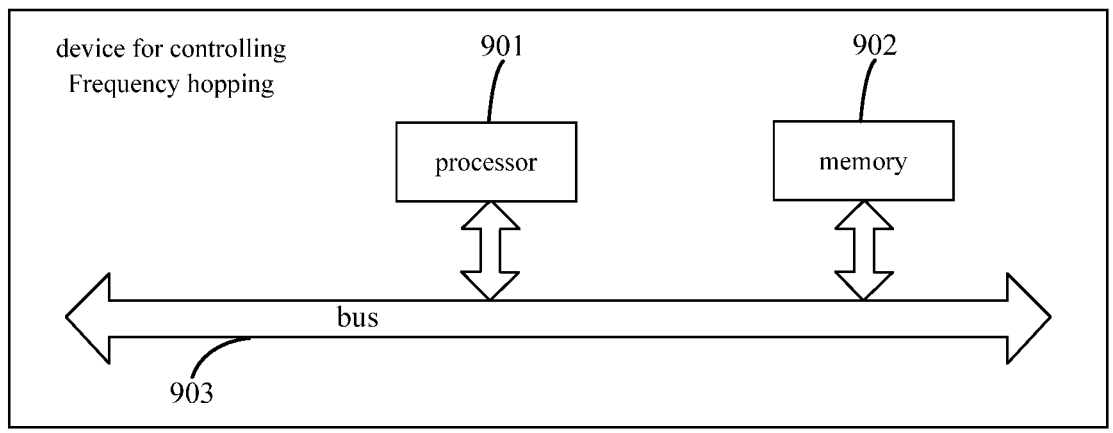
FIG. 9 is a schematic diagram of a structural framework of a device for controlling frequency hopping according to an eleventh embodiment of the present disclosure.

FIG. 9 is a schematic diagram of a structural framework of a device for controlling frequency hopping according to an eleventh embodiment of the present disclosure.

Referring to FIG. 9, the device includes: at least one processor 901, and at least one memory 902 communicatively connected to the processor 901, wherein:

the memory 902 stores program instructions executable by the processor 901, and the processor 901 invokes the program instructions to execute the method provided by the fourth embodiment shown in FIG. 4 and related embodiments thereof, for example, the method includes:

switching a frequency used for receiving synchronization data to a corresponding pre-configured synchronization frequency value for sending the synchronization data by the transmitter when a time slot for receiving a synchronization frame is detected to be reached, and receiving the synchronization frame at the corresponding pre-configured synchronization frequency value switched to;

after the synchronization frame sent by the transmitter is received and frequency hopping synchronization is complete, switching the frequency used for receiving the synchronization data from the previous corresponding pre-configured synchronization frequency value to a next corresponding pre-configured synchronization frequency value used for sending the synchronization data by the transmitter, and receiving the synchronization frame at the next corresponding pre-configured synchronization frequency value switched to;

after total time slots for receiving the synchronization frame is complete, switching a frequency used for sending or receiving data to the corresponding pre-configured data frequency value for sending or receiving data by the transmitter when a time slot for sending or receiving data is detected to be reached, and sending a data frame at the corresponding pre-configured data frequency value switched to when a time slot for sending the data frame is detected to be reached; or receiving the data frame at the corresponding pre-configured data frequency value switched to when a time slot for receiving the data frame is detected to be reached;

after the previous data frame is sent or received, switching the frequency used for sending or receiving data from the previous corresponding pre-configured data frequency value to a next corresponding pre-configured data frequency value for sending or receiving data by the transmitter, and sending the data frame at the next corresponding pre-configured data frequency value switched to; or receiving the data frame at the next corresponding pre-configured data frequency value switched to.

Referring to FIG. 9, in the present embodiment, the processor 901 and the memory 902 communicate with each other via a bus 903.

A twelfth embodiment of the present disclosure discloses a receiver, including the device as shown in FIG. 9. Since the above-described embodiment has described optional implementations of the device in detail, further description thereof will be omitted.

A thirteenth embodiment of the present disclosure discloses a computer program product, the computer program product includes a computer program stored on a non-transitory computer-readable storage medium, the computer program including program instructions which, when executed by a computer, cause the computer to perform the method provided by the fourth embodiment shown in FIG. 4 and related embodiments thereof, for example, the method includes:

switching a frequency used for receiving synchronization data to a corresponding pre-configured synchronization frequency value for sending the synchronization data by the transmitter when a time slot for receiving a synchronization frame is detected to be reached, and receiving the synchronization frame at the corresponding pre-configured synchronization frequency value switched to;

after the synchronization frame sent by the transmitter is received and frequency hopping synchronization is complete, switching the frequency used for receiving the synchronization data from the previous corresponding pre-configured synchronization frequency value to a next corresponding pre-configured synchronization frequency value used for sending the synchronization data by the transmitter, and receiving the synchronization frame at the next corresponding pre-configured synchronization frequency value switched to;

after total time slots for receiving the synchronization frame is complete, switching a frequency used for sending or receiving data to the corresponding pre-configured data frequency value for sending or receiving data by the transmitter when a time slot for sending or receiving data is detected to be reached, and sending a data frame at the corresponding pre-configured data frequency value switched to when a time slot for sending the data frame is detected to be reached; or receiving the data frame at the corresponding pre-configured data frequency value switched to when a time slot for receiving the data frame is detected to be reached;

after the previous data frame is sent or received, switching the frequency used for sending or receiving data from the previous corresponding pre-configured data frequency value to a next corresponding pre-configured data frequency value for sending or receiving data by the transmitter, and sending the data frame at the next corresponding pre-configured data frequency value switched to; or receiving the data frame at the next corresponding pre-configured data frequency value switched to.

A fourteenth embodiment of the present disclosure discloses a non-transient computer-readable storage medium, the non-transient computer-readable storage medium stores computer instructions that cause a computer to perform the method provided by the fourth embodiment shown in FIG. 4 and related embodiments thereof, for example, the method includes:

switching a frequency used for receiving synchronization data to a corresponding pre-configured synchronization frequency value for sending the synchronization data by a transmitter when a time slot for receiving a synchronization frame is detected to be reached, and receiving the synchronization frame at the corresponding pre-configured synchronization frequency value switched to;

after the synchronization frame sent by the transmitter is received and frequency hopping synchronization is complete, switching the frequency used for receiving the synchronization data from the previous corresponding pre-configured synchronization frequency value to a next corresponding pre-configured synchronization frequency value used for sending the synchronization data by the transmitter, and receiving the synchronization frame at the next corresponding pre-configured synchronization frequency value switched to;

after total time slots for receiving the synchronization frame is complete, switching a frequency used for sending or receiving data to the corresponding pre-configured data frequency value for sending or receiving data by the transmitter when a time slot for sending or receiving data is detected to be reached, and sending a data frame at the corresponding pre-configured data frequency value switched to when a time slot for sending the data frame is detected to be reached; or receiving the data frame at the corresponding pre-configured data frequency value switched to when a time slot for receiving the data frame is detected to be reached; and after the previous data frame is sent or received, switching the frequency used for sending or receiving data from the previous corresponding pre-configured data frequency value to a next corresponding pre-configured data frequency value for sending or receiving data by the transmitter, and sending the data frame at the next corresponding pre-configured data frequency value switched to; or receiving the data frame at the next corresponding pre-configured data frequency value switched to.

It will be appreciated by those skilled in the art that the present disclosure includes devices for performing one or more of the operations described herein. These devices may be optionally designed and manufactured for the required purposes, or may include known devices in general-purpose computers. These devices have computer programs stored therein that are selectively activated or reconfigured. Such computer programs may be stored in a device (e.g., a computer) readable medium or any type of media suitable for storing electronic instructions and coupled to a bus, and the computer readable medium includes, but not limited to, any type of disk (including floppy disks, hard disks, optical disks, CD-ROMs, and magneto-optical disks), ROM (Read-Only Memory), RAM (Random Access Memory), EPROM (Erasable Programmable Read-Only Memory), EEPROM (Electrically Erasable Programmable Read-Only Memory), flash memory, magnetic cards or optical cards. That is, a readable medium includes any medium that stores or transmits information in a form readable by a device (e.g., a computer).

It will be appreciated by those skilled in the art that each block of the structural diagrams and/or block diagrams and/or flowcharts, and combinations of the blocks in the structural diagrams and/or block diagrams and/or flowcharts, can be implemented with computer program instructions. Those skilled in the art will appreciate that these computer program instructions may be provided to a processor of a general purpose computer, a optional purpose computer, or other programmable data processing methods to perform the functions specified in the structural diagrams and/or block diagrams and/or flowcharts of the present disclosure by the processor of the computer or other programmable data processing methods.

It will be appreciated by those skilled in the art that the various operations, methods, steps in the processes, measures and solutions discussed in the present disclosure may be alternated, altered, combined, or deleted. Further, other steps, measures, solutions having various operations, methods, or flows discussed herein may be alternated, altered, rearranged, decomposed, combined, or deleted. Further, the steps, measures, solutions in various operations, methods, processes disclosed herein in the prior art may be alternated, altered, rearranged, decomposed, combined, or deleted.

While the foregoing is directed to only a few embodiments of the present disclosure, it should be understood by those skilled in the art that various changes and modifications may be made without departing from the spirit and scope of the present disclosure, and those changes and modifications shall fall within the scope of the present disclosure.

INDUSTRIAL APPLICABILITY

According to the technical solution of the present disclosure, a frequency used for sending synchronization data is switched to any of a plurality of pre-configured synchronization frequency values when a time slot for sending a synchronization frame is detected to be reached, and the synchronization frame is sent at the pre-configured synchronization frequency value switched to; after the previous synchronization frame is sent, the frequency used for sending the synchronization data is switched from the previous pre-configured synchronization frequency value to any of the plurality of pre-configured synchronization frequency values after the previous synchronization frame is sent, and the synchronization frame is sent at the pre-configured synchronization frequency value switched to; after total time slots for sending the synchronization frame is complete, a frequency used for sending or receiving data is switched to any of a plurality of pre-configured data frequency values, and a data frame is sent at the pre-configured data frequency value switched to when a time slot for sending the data frame is detected to be reached; or the data frame is received at the pre-configured data frequency value switched to when a time slot for receiving the data frame is detected to be reached; after the previous data frame is sent or received, the frequency used for sending or receiving data is switched from the previous pre-configured data frequency value to any of the plurality of pre-configured frequency, and the data frame is sent at the pre-configured data frequency value switched to; or, the data frame is received at the pre-configured data frequency value switched to. Therefore, the operating state of the frequency hopping system is precisely controlled, unpredictable abnormalities of the frequency hopping system may not occur; even when abnormalities of the frequency hopping system occur, reasons for the abnormalities can be easily found on the basis of the precise control of the operating state of the frequency hopping system, thereby improving the controllability of the frequency hopping system, and the stability, the robustness and the data transmission efficiency of the frequency hopping system are further effectively improved, which renders great industrial applicability.

What is claimed is:

1. A method for controlling frequency hopping, comprising:

switching a frequency used for sending synchronization data to any of a plurality of pre-configured synchronization frequency values when a time slot for sending a synchronization frame is detected to be reached, and sending the synchronization frame at the pre-configured synchronization frequency value switched to;

after the previous synchronization frame is sent, switching the frequency used for sending the synchronization data from the previous pre-configured synchronization frequency value to any of the plurality of pre-configured synchronization frequency values, and sending the synchronization frame at the pre-configured synchronization frequency value switched to;

after total time slots for sending the synchronization frame is complete, switching a frequency used for sending or receiving data to any of a plurality of pre-configured data frequency values, and sending a data frame at the pre-configured data frequency value switched to when a time slot for sending the data frame is detected to be reached; or receiving the data frame at the pre-configured data frequency value switched to when a time slot for receiving the data frame is detected to be reached; and after the previous data frame is sent or received, switching the frequency used for sending or receiving data from the previous pre-configured data frequency value to any of the plurality of pre-configured frequency, and sending the data frame at the pre-configured data frequency value switched to; or, receiving the data frame at the pre-configured data frequency value switched to.

2. The method of claim 1, wherein the method further comprises:

detecting a next time slot for sending the synchronization frame when total time slots for sending or receiving the data frame is complete.

3. The method of claim 1, wherein the synchronization data comprises a transmitter frequency hopping starting count value corresponding to a pre-set clock added into the synchronization frame;

wherein the method further comprises: checking the synchronization frame before the synchronization frame is sent.

4. The method of claim 1, wherein the step of after the previous data frame is sent or received, switching the frequency used for sending or receiving data from the previous pre-configured data frequency value to any of the plurality of pre-configured frequency values, and sending the data frame at the pre-configured data frequency value switched to; or, receiving the data frame at the pre-configured data frequency value switched to comprises:

after the previous data frame is sent or received, in a case that the next time slot is detected to be a time slot for sending the data frame and a data frame to be sent exists, switching the frequency used for sending or receiving data from the previous pre-configured data frequency value to any of the plurality of pre-configured frequency values, and sending the data frame when the time slot for sending the data frame is reached; or, after the previous data frame is sent or received, in a case that the next time slot is detected to be a time slot for receiving the data frame, switching the frequency used for sending or receiving data from the previous pre-configured data frequency value to any of the plurality of pre-configured frequency values, and receiving the data frame when the time slot for receiving the data frame is reached.

5. The method of claim 4, wherein the method further comprises:

after the previous data frame is sent or received, in a case that the next time slot is detected to be a time slot for sending the data frame and no data frame to be sent exists, not switching the data frequency and not sending data frame until the next time slot is detected to be a time slot for sending the data frame and a data frame to be sent exists, or until the next time slot is detected to be a time slot for receiving the data frame.

6. A transmitter, comprising a device for controlling frequency hopping, wherein the device of comprises:

at least one processor; and at least one memory communicatively connected to the processor, wherein:

the memory stores program instructions executable by the processor, the processor invoking the program instructions to perform:

switching a frequency used for sending synchronization data to any of a plurality of pre-configured synchronization frequency values when a time slot for sending a synchronization frame is detected to be reached, and sending the synchronization frame at the pre-configured synchronization frequency value switched to;

after the previous synchronization frame is sent, switching the frequency used for sending the synchronization data from the previous pre-configured synchronization frequency value to any of the plurality of pre-configured synchronization frequency values, and sending the synchronization frame at the pre-configured synchronization frequency value switched to;

after total time slots for sending the synchronization frame is complete, switching a frequency used for sending or receiving data to any of a plurality of pre-configured data frequency values, and sending a data frame at the pre-configured data frequency value switched to when a time slot for sending the data frame is detected to be reached; or receiving the data frame at the pre-configured data frequency value switched to when a time slot for receiving the data frame is detected to be reached; and after the previous data frame is sent or received, switching the frequency used for sending or receiving data from the previous pre-configured data frequency value to any of the plurality of pre-configured frequency, and sending the data frame at the pre-configured data frequency value switched to; or, receiving the data frame at the pre-configured data frequency value switched to.

7. A computer program product, comprising a computer program stored on a non-transitory computer readable storage medium, the computer program comprising program instructions which, when executed by a computer, cause the computer to perform:

switching a frequency used for sending synchronization data to any of a plurality of pre-configured synchronization frequency values when a time slot for sending a synchronization frame is detected to be reached, and sending the synchronization frame at the pre-configured synchronization frequency value switched to;

after the previous synchronization frame is sent, switching the frequency used for sending the synchronization data from the previous pre-configured synchronization frequency value to any of the plurality of pre-configured synchronization frequency values, and sending the synchronization frame at the pre-configured synchronization frequency value switched to;

after total time slots for sending the synchronization frame is complete, switching a frequency used for sending or receiving data to any of a plurality of pre-configured data frequency values, and sending a data frame at the pre-configured data frequency value switched to when a time slot for sending the data frame is detected to be reached; or receiving the data frame at the pre-configured data frequency value switched to when a time slot for receiving the data frame is detected to be reached; and after the previous data frame is sent or received, switching the frequency used for sending or receiving data from the previous pre-configured data frequency value to any of the plurality of pre-configured frequency, and sending the data frame at the pre-configured data frequency value switched to; or, receiving the data frame at the pre-configured data frequency value switched to.

\* \* \* \* \*